US012328730B2

(12) United States Patent
Yuan et al.

(10) Patent No.: US 12,328,730 B2
(45) Date of Patent: Jun. 10, 2025

(54) MULTIPLEXING FOR PHYSICAL UPLINK CHANNELS WITH DIFFERENT DIRECTIONAL BEAMS

(71) Applicant: QUALCOMM Incorporated, San Diego, CA (US)

(72) Inventors: Fang Yuan, Beijing (CN); Mostafa Khoshnevisan, San Diego, CA (US); Wooseok Nam, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 17/905,029

(22) PCT Filed: Mar. 4, 2020

(86) PCT No.: PCT/CN2020/077727
§ 371 (c)(1),
(2) Date: Aug. 25, 2022

(87) PCT Pub. No.: WO2021/174437
PCT Pub. Date: Sep. 10, 2021

(65) Prior Publication Data
US 2023/0171777 A1    Jun. 1, 2023

(51) Int. Cl.
*H04W 72/21* (2023.01)
*H04L 1/08* (2006.01)
*H04W 16/28* (2009.01)

(52) U.S. Cl.
CPC ............... *H04W 72/21* (2023.01); *H04L 1/08* (2013.01); *H04W 16/28* (2013.01)

(58) Field of Classification Search
CPC ........ H04W 72/21; H04W 16/28; H04L 1/08; H04B 7/0695; H04B 7/0623; H04B 7/0626; H04B 7/0634; H04B 7/0639
See application file for complete search history.

(56) References Cited

U.S. PATENT DOCUMENTS

2017/0367114 A1    12/2017    Ahn et al.
2018/0132264 A1    5/2018    Jung et al.
(Continued)

FOREIGN PATENT DOCUMENTS

CN    110063039 A    7/2019
CN    110350953 A    10/2019
(Continued)

OTHER PUBLICATIONS

Supplementary European Search Report—EP20923156—Search Authority—Munich—Oct. 23, 2023.
(Continued)

*Primary Examiner* — Jianye Wu
(74) *Attorney, Agent, or Firm* — Holland & Hart LLP

(57) ABSTRACT

Methods, systems, and devices for wireless communications are described. A communication device, which may be otherwise known as a user equipment (UE) may determine a set of repetitions of a first uplink data channel associated with a first directional beam and a set of repetitions of a second uplink data channel associated with a second directional beam different from the first directional beam. The UE may multiplex an uplink transmission associated with an uplink control channel with one or both of the first uplink data channel and the second uplink data channel, based on the set of repetitions of the first uplink data channel and the set of repetitions of the second uplink data channel. As a result, the UE may transmit the multiplexed uplink trans-
(Continued)

mission on one or both of the first uplink data channel and the second uplink data channel.

35 Claims, 19 Drawing Sheets

(56) References Cited

U.S. PATENT DOCUMENTS

2019/0230683 A1* 7/2019 Akkarakaran .... H04W 72/1268
2019/0261280 A1* 8/2019 Jung .................. H04W 52/242
2019/0319823 A1 10/2019 Akkarakaran et al.

FOREIGN PATENT DOCUMENTS

| CN | 110611956 A | 12/2019 |
| CN | 110769502 A | 2/2020 |
| EP | 3113404 A1 | 1/2017 |

OTHER PUBLICATIONS

Intelcorporation: "OnUE Initiated Beam Recovery", 3GPPTSG-RAN WG1 #88bis, R1-1704725, Spokane, USA, Apr. 3-7, 2017, pp. 1-4, Sections2, 3.

International Search Report and Written Opinion—PCT/CN2020/077727—ISA/EPO—Dec. 16, 2020.

Qualcomm Incorporated: "Long PUCCH Design with more than 2 bits UCI Payload", 3GPP TSG RAN WG1 Meeting #90, R1-1713433, Prague, Czech Republic, Aug. 21-25, 2017, Aug. 25, 2017(Aug. 25, 2017), pp. 1-8, p. 7, line 1-p. 8, line 3.

Qualcomm Incorporated: "Long PUCCH Design with more than 2 Bits UCI Payload", 3GPP TSG RAN WG1 Meeting NR#3, R1-1716423, Nagoya, Japan, Sep. 18-21, 2017, pp. 1-9, p. 7, line 1-p. 8, line 3.

* cited by examiner

MULTIPLEXING FOR PHYSICAL UPLINK CHANNELS WITH DIFFERENT DIRECTIONAL BEAMS

CROSS REFERENCE

The present Application is a 371 national stage filing of International PCT Application No. PCT/CN2020/077727 by Yuan et al. entitled "MULTIPLEXING FOR PHYSICAL UPLINK CHANNELS WITH DIFFERENT DIRECTIONAL BEAMS," filed Mar. 4, 2020, which is assigned to the assignee hereof, and which is expressly incorporated by reference in its entirety herein.

FIELD OF TECHNOLOGY

The following relates generally to wireless communications and more specifically to multiplexing for physical uplink channels with different directional beams.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems, such as 4G and 5G systems, may support directional communications using one or multiple directional beams. Some wireless communications systems, such as 4G and 5G systems, may support repetition of physical channels, such as physical uplink control channels (PUCCH) or physical uplink shared channels (PUSCH), or both. As demand for communication efficiency increases, some wireless communications systems, such as 4G and 5G systems, may be unable to support uplink operations (e.g., multiplexing uplink communications) over a repetition of some physical channels, such as PUCCH or PUSCH, or both, as well as with diverse multiple directional beams, among other examples.

SUMMARY

Various aspects of the described techniques relate to configuring a communication device, which may be otherwise known as user equipment (UE), to provide uplink communications (e.g., uplink control information (UCI), etc.) over a repetition of one or multiple physical uplink channels (e.g., physical uplink control channels (PUCCH) or physical uplink shared channels (PUSCH)), as well as using one or multiple disparate directional beams. The described techniques may be used to configure the UE to support multiplexing operations for the uplink communications over the repetition of the one or multiple physical uplink channels (e.g., PUCCH, PUSCH) and the one or multiple disparate directional beams. For example, the UE may be configured to multiplex a UCI on two or more consecutive PUSCH or PUCCH repetitions with different directional beams. Similarly, the UE may be configured to multiplex a UCI on two or more consecutive PUSCH or PUCCH repetitions with different directional beams carrying an aperiodic channel state information (CSI) report. The UE may thus support multiplexing uplink communications for repeating physical uplink channels (e.g., PUCCH, PUSCH) with different directional beams. The described techniques may, as a result, include features for improvements to uplink communications and, in some examples, may promote enhanced efficiency for high reliability and low latency uplink operations in 5G systems, among other benefits.

A method of wireless communications at a UE is described. The method may include determining a set of repetitions of a first uplink data channel associated with a first directional beam and a set of repetitions of a second uplink data channel associated with a second directional beam different from the first directional beam, multiplexing an uplink transmission associated with an uplink control channel with one or both of the first uplink data channel and the second uplink data channel, based on the set of repetitions of the first uplink data channel and the set of repetitions of the second uplink data channel, and transmitting the multiplexed uplink transmission on one or both of the first uplink data channel and the second uplink data channel.

An apparatus for wireless communications is described. The apparatus may include a processor, memory coupled with the processor, and instructions stored in the memory. The instructions may be executable by the processor to cause the apparatus to determine a set of repetitions of a first uplink data channel associated with a first directional beam and a set of repetitions of a second uplink data channel associated with a second directional beam different from the first directional beam, multiplex an uplink transmission associated with an uplink control channel with one or both of the first uplink data channel and the second uplink data channel, based on the set of repetitions of the first uplink data channel and the set of repetitions of the second uplink data channel, and transmit the multiplexed uplink transmission on one or both of the first uplink data channel and the second uplink data channel.

Another apparatus for wireless communications is described. The apparatus may include means for determining a set of repetitions of a first uplink data channel associated with a first directional beam and a set of repetitions of a second uplink data channel associated with a second directional beam different from the first directional beam, multiplexing an uplink transmission associated with an uplink control channel with one or both of the first uplink data channel and the second uplink data channel, based on the set of repetitions of the first uplink data channel and the set of repetitions of the second uplink data channel, and transmitting the multiplexed uplink transmission on one or both of the first uplink data channel and the second uplink data channel.

A non-transitory computer-readable medium storing code for wireless communications at a UE is described. The code may include instructions executable by a processor to determine a set of repetitions of a first uplink data channel associated with a first directional beam and a set of repetitions of a second uplink data channel associated with a second directional beam different from the first directional beam, multiplex an uplink transmission associated with an uplink control channel with one or both of the first uplink data channel and the second uplink data channel, based on the set of repetitions of the first uplink data channel and the set of repetitions of the second uplink data channel, and transmit the multiplexed uplink transmission on one or both of the first uplink data channel and the second uplink data channel.

In some examples of the method, apparatuses, and non-transitory computer-readable medium described herein, multiplexing the uplink transmission may include operations, features, means, or instructions for determining that one or both of a repetition associated with the set of repetitions of the first uplink data channel and a repetition associated with the set of repetitions of the second uplink data channel satisfies a timing boundary associated with the uplink control channel, and multiplexing the uplink transmission with one or both of the first uplink data channel and the second uplink data channel based on one or both of the repetition of the first uplink data channel and the repetition of the second uplink data channel satisfying the timing boundary associated with the uplink control channel.

In some examples of the method, apparatuses, and non-transitory computer-readable medium described herein, determining that one or both of the repetition associated with the set of repetitions of the first uplink data channel and the repetition associated with the set of repetitions of the second uplink data channel satisfy the timing boundary associated with the uplink control channel may include operations, features, means, or instructions for determining an overlap between the uplink control channel and one or both of the repetition associated with the set of repetitions of the first uplink data channel and the repetition associated with the set of repetitions of the second uplink data channel, where multiplexing the uplink transmission includes, and multiplexing the uplink transmission with the repetition of the first uplink data channel and the repetition of the second uplink data channel based on the overlap between the uplink control channel and one or both of the repetition of the first uplink data channel or the repetition of the second uplink data channel.

In some examples of the method, apparatuses, and non-transitory computer-readable medium described herein, determining the overlap may include operations, features, means, or instructions for determining that a resource associated with the uplink control channel overlaps with one or both of a resource associated with the repetition of the first uplink data channel and a resource associated with the repetition of the second uplink data channel.

Some examples of the method, apparatuses, and non-transitory computer-readable medium described herein may further include operations, features, means, or instructions for determining an overlap between the uplink control channel and one or both of a first repetition associated with the set of repetitions of the first uplink data channel and a first repetition associated with the set of repetitions of the second uplink data channel, where multiplexing the uplink transmission includes, and multiplexing the uplink transmission with the first repetition of the first uplink data channel and the first repetition of the second uplink data channel based on the overlap between the uplink control channel and one or both of the first repetition of the first uplink data channel or the first repetition of the second uplink data channel.

Some examples of the method, apparatuses, and non-transitory computer-readable medium described herein may further include operations, features, means, or instructions for determining an overlap between the uplink control channel and one or both of a second repetition associated with the set of repetitions of the first uplink data channel and a second repetition associated with the set of repetitions of the second uplink data channel, where multiplexing the uplink transmission includes, and multiplexing the uplink transmission with the second repetition of the first uplink data channel and the second repetition of the second uplink data channel based on the overlap between the uplink control channel and one or both of the second repetition of the first uplink data channel or the second repetition of the second uplink data channel.

Some examples of the method, apparatuses, and non-transitory computer-readable medium described herein may further include operations, features, means, or instructions for determining an overlap between the uplink control channel and a first repetition associated with the set of repetitions of the second uplink data channel, where multiplexing the uplink transmission includes, and multiplexing the uplink transmission with the first repetition of the second uplink data channel and a second repetition associated with the set of repetitions of the first uplink data channel based on the overlap between the uplink control channel and the first repetition of the second uplink data channel.

Some examples of the method, apparatuses, and non-transitory computer-readable medium described herein may further include operations, features, means, or instructions for determining a nonoverlap between the uplink control channel and a first repetition associated with the set of repetitions of the first uplink data channel, and refraining from multiplexing the uplink transmission with the first repetition of the first uplink data channel based on the nonoverlap.

In some examples of the method, apparatuses, and non-transitory computer-readable medium described herein, refraining from multiplexing the uplink transmission with the first repetition of the first uplink data channel may include operations, features, means, or instructions for dropping the first uplink data channel.

In some examples of the method, apparatuses, and non-transitory computer-readable medium described herein, the first repetition of the second uplink data channel occurs before the second repetition of the first uplink data channel.

Some examples of the method, apparatuses, and non-transitory computer-readable medium described herein may further include operations, features, means, or instructions for determining a nonoverlap between the uplink control channel and a second repetition associated with the set of repetitions of the first uplink data channel, and determining an overlap between the uplink control channel and a second repetition associated with the set of repetitions of the second uplink data channel.

In some examples of the method, apparatuses, and non-transitory computer-readable medium described herein, multiplexing the uplink transmission may include operations, features, means, or instructions for multiplexing the uplink transmission with the second repetition of the second uplink data channel based on the overlap between the uplink control channel and the second repetition of the second uplink data channel.

Some examples of the method, apparatuses, and non-transitory computer-readable medium described herein may further include operations, features, means, or instructions for refraining from multiplexing the uplink transmission with the second repetition of the second uplink data channel based on the second repetition of the second uplink data channel corresponding to an ending of a slot, and transmitting the uplink transmission on the uplink control channel based on the refraining.

In some examples of the method, apparatuses, and non-transitory computer-readable medium described herein, refraining from multiplexing the uplink transmission with the second repetition of the second uplink data channel may include operations, features, means, or instructions for dropping the second uplink data channel.

Some examples of the method, apparatuses, and non-transitory computer-readable medium described herein may further include operations, features, means, or instructions for receiving, during a first slot, a downlink control information (DCI) message including an indication to multiplex one or both of a second uplink transmission with the first uplink data channel and the second uplink data channel during a second slot.

Some examples of the method, apparatuses, and non-transitory computer-readable medium described herein may further include operations, features, means, or instructions for multiplexing the second uplink transmission on a second repetition associated with the set of repetitions of the first uplink data channel and a second repetition associated with the set of repetitions of the second uplink data channel based on the indication in the received DCI message.

In some examples of the method, apparatuses, and non-transitory computer-readable medium described herein, the second repetition of the first uplink data channel and the second repetition of the second uplink data channel may be consecutive.

In some examples of the method, apparatuses, and non-transitory computer-readable medium described herein, the second repetition of the first uplink data channel and the second repetition of the second uplink data channel may be nonconsecutive.

Some examples of the method, apparatuses, and non-transitory computer-readable medium described herein may further include operations, features, means, or instructions for determining an overlap between the uplink control channel and one or both of the second repetition of the first uplink data channel and the second repetition of the second uplink data channel, where multiplexing the uplink transmission includes, and multiplexing the uplink transmission with the second repetition of the first uplink data channel and the second repetition of the second uplink data channel based on the overlap between the uplink control channel and one or both of the second repetition of the first uplink data channel or the second repetition of the second uplink data channel.

Some examples of the method, apparatuses, and non-transitory computer-readable medium described herein may further include operations, features, means, or instructions for determining an overlap between the uplink control channel and the second repetition of the second uplink data channel, and refraining from multiplexing the uplink transmission with the second repetition of the first uplink data channel, where multiplexing the uplink transmission includes: multiplexing the uplink transmission with the second repetition of the second uplink data channel based on the overlap between the uplink control channel and the second repetition of the second uplink data channel, the second repetition of the second uplink data channel corresponding to an ending of the second slot.

In some examples of the method, apparatuses, and non-transitory computer-readable medium described herein, the uplink transmission includes an aperiodic channel state information report.

Some examples of the method, apparatuses, and non-transitory computer-readable medium described herein may further include operations, features, means, or instructions for determining one or both of a subset of repetitions associated with the set of repetitions of the first uplink data channel and a subset of repetitions associated with the set of repetitions of the second uplink data channel that satisfy a timing boundary associated with the uplink control channel, where multiplexing the uplink transmission includes, and multiplexing the uplink transmission with one or both of the subset of repetitions associated with the first uplink data channel and the subset of repetitions associated with the second uplink data channel based on satisfying the timing boundary.

In some examples of the method, apparatuses, and non-transitory computer-readable medium described herein, one or both of the subset of repetitions associated with the first uplink data channel and the subset of repetitions associated with the second uplink data channel may be associated with a same slot.

In some examples of the method, apparatuses, and non-transitory computer-readable medium described herein, multiplexing the uplink transmission may include operations, features, means, or instructions for multiplexing the uplink transmission with an earliest repetition associated with the first uplink data channel or the second uplink data channel to a latest repetition associated with the first uplink data channel or the second uplink data channel.

Some examples of the method, apparatuses, and non-transitory computer-readable medium described herein may further include operations, features, means, or instructions for determining a type of the uplink transmission, where multiplexing the uplink transmission with one or both of the first uplink data channel and the second uplink data channel may be based on the type of the uplink transmission.

In some examples of the method, apparatuses, and non-transitory computer-readable medium described herein, the uplink transmission includes UCI and the type includes an UCI type.

Some examples of the method, apparatuses, and non-transitory computer-readable medium described herein may further include operations, features, means, or instructions for determining a payload size of the uplink transmission, where multiplexing the uplink transmission with one or both of the first uplink data channel and the second uplink data channel may be based on the payload size of the uplink transmission.

In some examples of the method, apparatuses, and non-transitory computer-readable medium described herein, the uplink transmission includes UCI and the payload size includes an UCI payload size.

Some examples of the method, apparatuses, and non-transitory computer-readable medium described herein may further include operations, features, means, or instructions for receiving a DCI message including an indication of a duration of each repetition associated with the set of repetitions of the first uplink data channel and a duration of each repetition associated with the number repetitions of the second uplink data channel, and determining resources to use for the uplink transmission when multiplexing the uplink transmission with one or both of the first uplink data channel and the second uplink data channel based on the indication received in the DCI message.

In some examples of the method, apparatuses, and non-transitory computer-readable medium described herein, a repetition associated with the set of repetitions of the first uplink data channel and a repetition associated with the set of repetitions of the second uplink data channel may be consecutive.

In some examples of the method, apparatuses, and non-transitory computer-readable medium described herein, a repetition associated with the set of repetitions of the first uplink data channel and a repetition associated with the set of repetitions of the second uplink data channel may be nonconsecutive.

In some examples of the method, apparatuses, and non-transitory computer-readable medium described herein, the first uplink data channel and the second uplink data channel include a PUSCH.

In some examples of the method, apparatuses, and non-transitory computer-readable medium described herein, the uplink control channel includes a PUCCH.

In some examples of the method, apparatuses, and non-transitory computer-readable medium described herein, the uplink transmission includes UCI.

In some examples of the method, apparatuses, and non-transitory computer-readable medium described herein, the uplink transmission includes an aperiodic CSI.

In some examples of the method, apparatuses, and non-transitory computer-readable medium described herein, the set of repetitions associated with the first uplink data channel and the set of repetitions associated with the second uplink data channel include a cyclic repetition.

In some examples of the method, apparatuses, and non-transitory computer-readable medium described herein, the set of repetitions associated with the first uplink data channel and the set of repetitions associated with the second uplink data channel include a sequential repetition.

DETAILED DESCRIPTION

Figure 1:
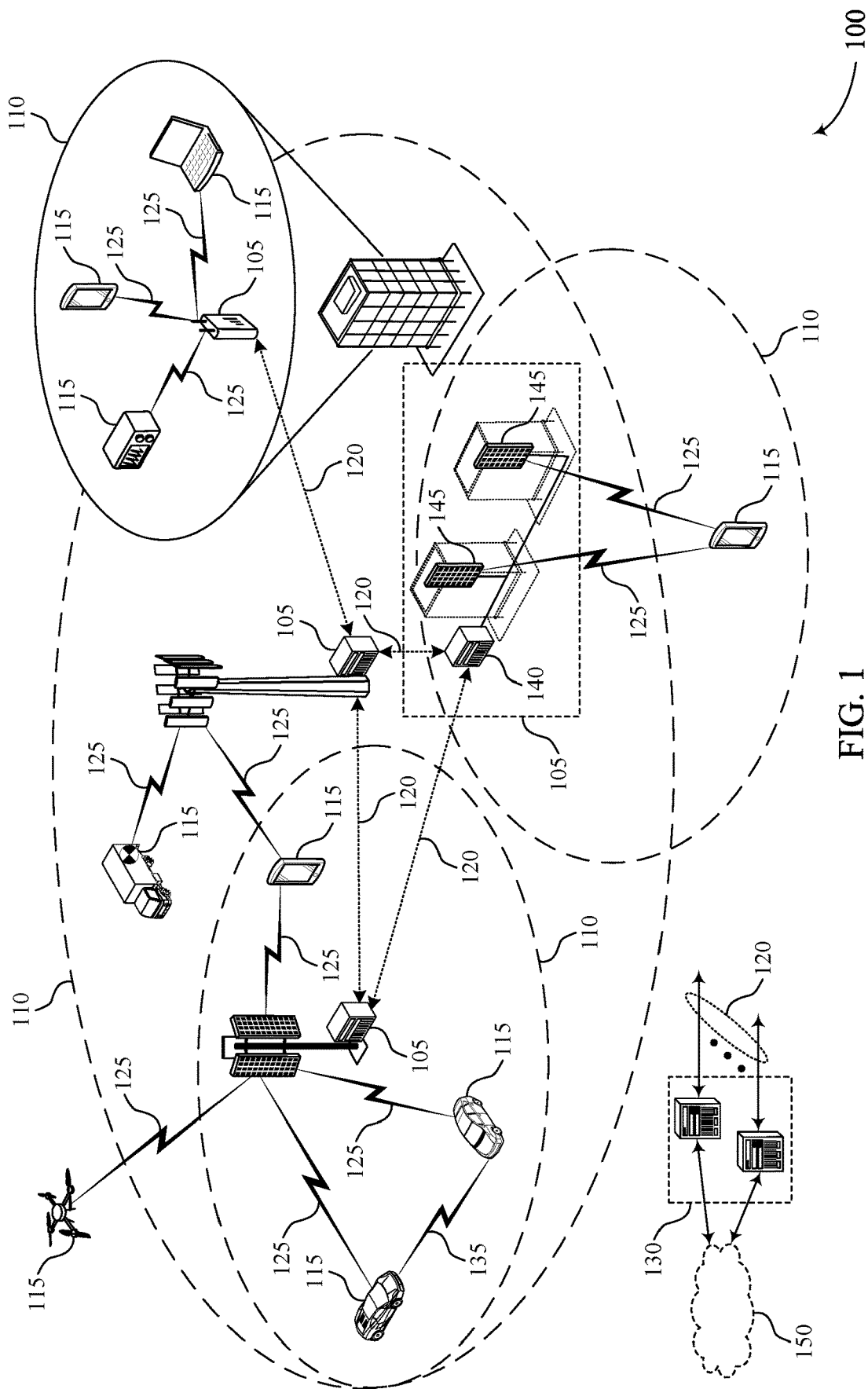
FIGS. 1 and 2 illustrate examples of wireless communications systems in accordance with aspects of the present disclosure.

Wireless communications systems may include multiple communication devices such as user equipment (UEs) and base stations, which may provide wireless communication services to the UEs. For example, such base stations may be next-generation NodeBs or giga-NodeBs (either of which may be referred to as a gNB) that may support multiple radio access technologies including fourth generation (4G) systems, such as Long Term Evolution (LTE) systems, as well as fifth generation (5G) systems, which may be referred to as New Radio (NR) systems. The described techniques may be used to configure the UEs to support uplink directional communications using one or multiple directional beams. In some examples, the described techniques may be used to configure the UEs to support repetition of some physical uplink channels, such as a physical uplink control channel (PUCCH) or a physical uplink shared channel (PUSCH), or both, to improve reliability of uplink communications (e.g., control information, data). Additionally or alternatively, in some examples, the described techniques may be used to configure the UEs to support uplink directional communications over a repetition of some physical channels, such as PUCCH or PUSCH, or both, using diverse multiple directional beams.

A UE may be configured to determine a set of repetitions of an uplink data channel (e.g., a PUSCH) associated with a directional beam and a set of repetitions of an additional uplink data channel (e.g., an additional PUSCH) associated with an additional directional beam. The UE may be configured to multiplex an uplink transmission, for example, such as UCI associated with an uplink control channel (e.g., a PUCCH) with one or both of the uplink data channels. In some examples, the UE may determine that the directional beams are available prior to multiplexing the uplink transmission. The UE may then transmit the multiplexed uplink transmission on one or both of the uplink data channels. Thus, the UE may be configured to multiplex UCI with multiple uplink channel repetitions (e.g., multiple PUSCH repetitions) with different directional beams.

Particular aspects of the subject matter described in this disclosure may be implemented to realize one or more of the following potential improvements, among others. The techniques employed by the UE may provide benefits and enhancements to the operation of the UE. For example, operations performed by the UE may provide improvements to uplink directional communications when operating in 5G systems. In some examples, configuring the UE to support multiplexing physical uplink channels carrying uplink directional communications using different directional beams, among other examples in 5G systems, may support improvements to resource usage, coverage enhancement and, in some examples, may promote enhanced efficiency for uplink operations, among other benefits.

Aspects of the disclosure are initially described in the context of wireless communications systems. Aspects of the disclosure are further illustrated by and described with reference to transmission timelines that relate to multiplexing for physical uplink channels with different directional beams. Aspects of the disclosure are further illustrated by and described with reference to diagrams and flowcharts that relate to multiplexing for physical uplink channels with different directional beams.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UE 115 may support handling multiplexing UCI for overlapped PUCCH and PUSCH. In some examples, the UE 115 may be configured to support handling multiplexing UCI for overlapped PUCCH and PUSCH for one or both slot-based and sub-slot based uplink communications. In some examples, the UE 115 may receive a message including an indication for one or both slot-based and sub-slot based uplink communications. For example, the UE 115 may receive an indication (e.g., a subslotLenght-For-PUCCH), a slot for an associated PUCCH transmission may be equal to a number of symbols indicated by the indication (e.g., the subslotLenght-ForPUCCH).

The UE 115 may be configured to provide control information (e.g., UCI) to the base station 105. In some examples, if a UE 115 transmits multiple PUSCHs in a slot on respective serving cells that include first PUSCHs that are scheduled by DCI formats and second PUSCHs configured by respective parameters (e.g., ConfiguredGrantConfig or semiPersistentOnPUSCH), and the UE 115 would multiplex UCI in one of the multiple PUSCHs, and the multiple PUSCHs fulfill one or more conditions for UCI multiplexing, the UE 115 multiplexes the UCI in a PUSCH from the first PUSCHs.

In some other examples, if a UE 115 transmits multiple PUSCHs in a slot on respective serving cells and the UE 115 would multiplex UCI in one of the multiple PUSCHs and the UE 115 does not multiplex aperiodic CSI in any of the multiple PUSCHs, the UE 115 multiplexes the UCI in a PUSCH of the serving cell with the smallest serving cell index (e.g., ServCellIndex) for UCI multiplexing being fulfilled. If the UE 115 transmits more than one PUSCHs in the slot on the serving cell with the smallest serving cell index for UCI multiplexing, the UE 115 multiplexes the UCI in the earliest PUSCH that the UE 115 transmits in the slot. In other examples, for a single PUSCH with aperiodic CSI, a UE 115 does not expect a PUCCH resource that results from multiplexing overlapped PUCCH resources, if applicable, to overlap with more than one PUSCHs if each of the more than one PUSCHs includes aperiodic CSI reports.

The UEs 115 may support uplink directional communications using one or multiple directional beams. In some examples, the UEs 115 may support repetition of some physical uplink channels, such as a PUCCH or a PUSCH, or both, to improve reliability of uplink communications (e.g., control information, data). Additionally or alternatively, in some examples, the UEs 115 may support uplink directional communications over a repetition of some physical channels, such as PUCCH or PUSCH, or both, using diverse multiple directional beams.

A UE 115 may be configured to determine a set of repetitions of an uplink data channel (e.g., a PUSCH) associated with a directional beam and a set of repetitions of an additional uplink data channel (e.g., an additional PUSCH) associated with an additional directional beam. The UE 115 may be configured to multiplex an uplink transmission, for example, such as UCI associated with an uplink control channel (e.g., a PUCCH) with one or both of the uplink data channels. In some examples, the UE 115 may determine that the directional beams are available prior to multiplexing the uplink transmission. The UE 115 may then transmit the multiplexed uplink transmission on one or both of the uplink data channels. Thus, the UE 115 may be configured to multiplex UCI with multiple uplink channel repetitions (e.g., multiple PUSCH repetitions) with different directional beams.

Figure 2:
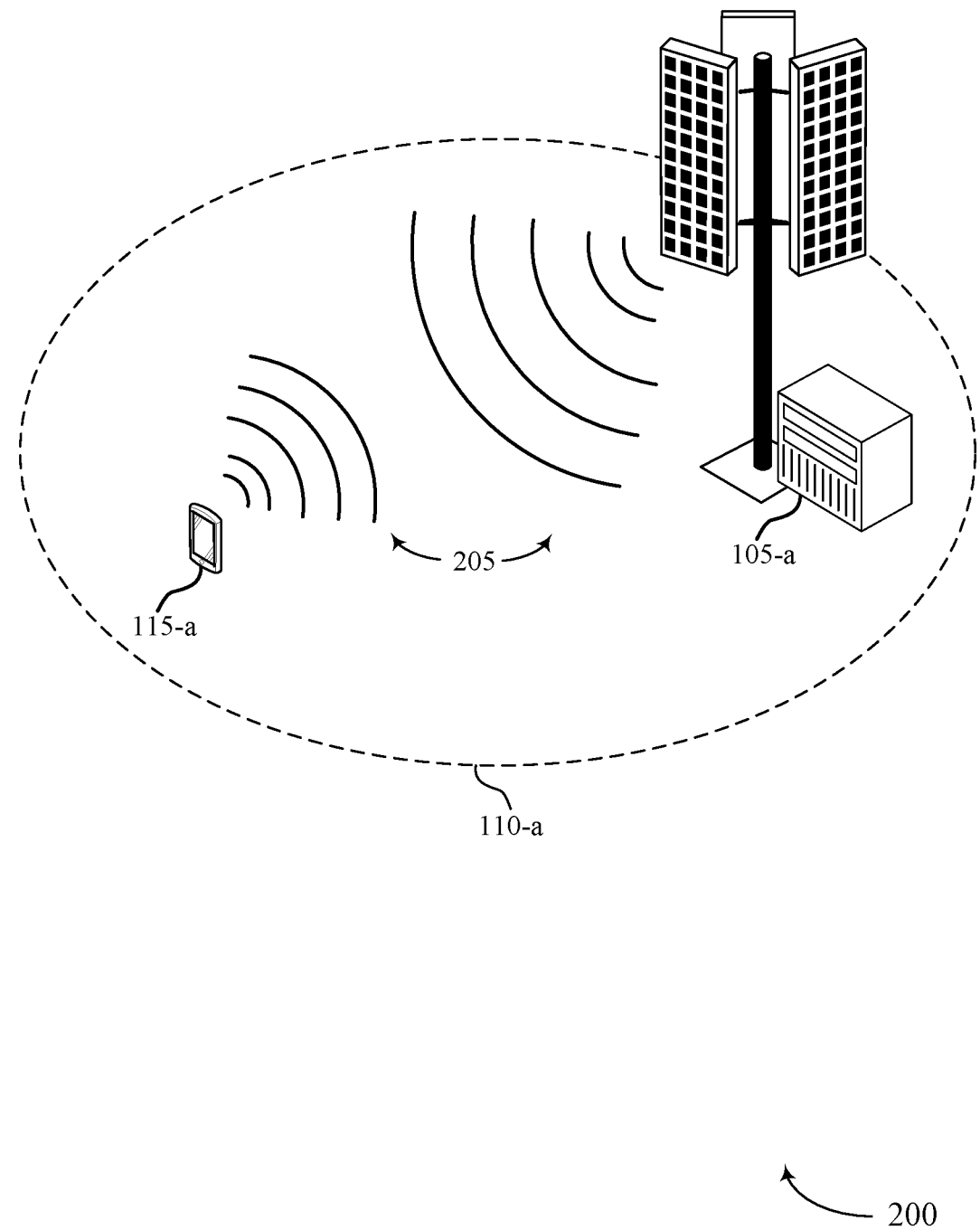

FIG. 2 illustrates an example of a wireless communications system 200 in accordance with aspects of the present disclosure. In some examples, the wireless communications system 200 may implement aspects of the wireless communications system 100. For example, the wireless communications system 200 may include a base station 105-*a* and a UE 115-*a* within a geographic coverage area 110-*a*. The base station 105-*a* and the UE 115-*a* may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption and, in some examples, may promote enhanced efficiency for high reliability and low latency uplink communications, among other benefits.

The base station 105-*a* and the UE 115-*a* may be configured with multiple antennas, which may be used to employ techniques such as transmit diversity, receive diversity, multiple-input multiple-output communications, or beamforming, or any combination thereof. The antennas of the base station 105-*a* and the UE 115-*a* may be located within one or more antenna arrays or antenna panels, which may support multiple-input multiple-output operations or transmit or receive beamforming. For example, the base station 105 antennas or antenna arrays may be co-located at an antenna assembly, such as an antenna tower. In some examples, antennas or antenna arrays associated with the base station 105-*a* may be located in diverse geographic locations. The base station 105-*a* may have an antenna array with a number of rows and columns of antenna ports that the base station 105-*a* may use to support beamforming of communications with the UE 115-*a*. Likewise, the UE 115-*a* may have one or more antenna arrays that may support various multiple-input multiple-output or beamforming operations. Additionally or alternatively, an antenna panel may support radio frequency beamforming for a signal transmitted via one or more antenna ports. The base station 105-*a* and the UE 115-*a* may thus be configured to support directional communications 205 using the multiple antennas.

The UE 115-*a*, in the wireless communications system 200, may support operations to preserve resources (for example, time and frequency resources of the wireless communications system 200), a battery life of the UE 115-*a*, among other examples. In some examples, the UE 115-*a* may be configured to support operations to manage or improve the directional communications 205 between the base station 105-*a* and the UE 115-*a*. For example, the base station 105-*a* may configure the UE 115-*a* to support multiplexing uplink communications (e.g., UCI) on different directional beams. In some examples, the base station 105-*a* may configure the UE 115-*a* to support multiplexing uplink communications (e.g., UCI) on multiple different uplink data channels (e.g., multiple different PUSCH) corresponding to different directional beams. In some other example, the base station 105-*a* may configure the UE 115-*a* to support multiplexing uplink communications (e.g., UCI) on multiple different uplink data channels repetitions (e.g., multiple different PUSCH repetitions) corresponding to different directional beams to improve efficiency and reliability of the directional communications 205 (e.g., improve reliability of communicating UCI).

The base station 105-*a* may transmit, and the UE 115-*a* may receive, control information, for example, such a downlink control information (DCI) message that may schedule multiple uplink channels (e.g., PUSCH, PUCCH) across multiple different directional beams. In some examples, the base station 105-*a* may configure the UE 115-*a* with an uplink repetition configuration (e.g., a PUSCH repetition configuration, a PUSCH (re)transmission configuration, etc.), such that the UE 115-*a* may extend uplink coverage for UCI, among other examples. For example, the base station 105-*a* may transmit, via higher layer signaling, the uplink repetition configuration to the UE 115-*a*. Examples of higher layer signaling may include RRC signaling, MAC-CE signaling, etc. The UE 115-*a* may thus be configured to support multiplexing uplink communications (e.g., UCI) on multiple different uplink data channels repetitions (e.g., multiple different PUSCH repetitions) corresponding to different directional beams to improve efficiency and reliability of the directional communications 205. Examples of uplink directional communications are described with reference to FIGS. 3 and 4.

Figure 3:
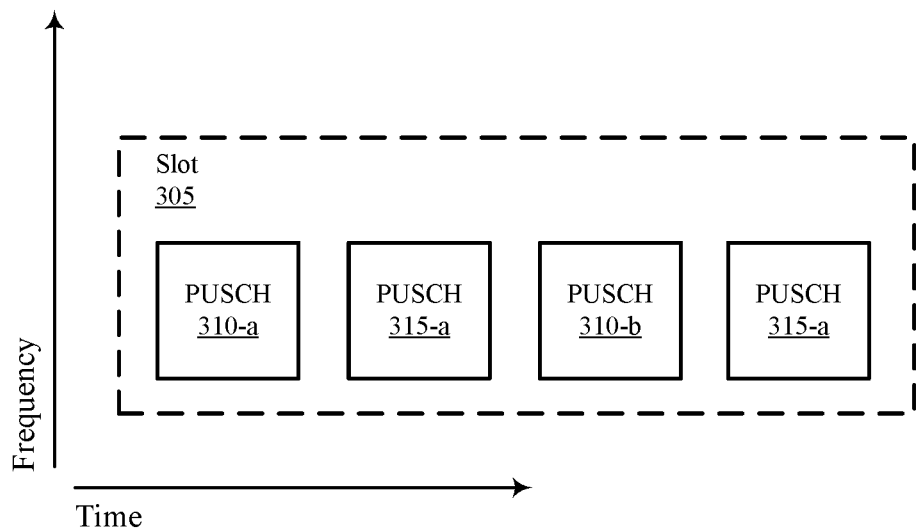
FIGS. 3 through 13 illustrate examples of transmission timelines in accordance with aspects of the present disclosure.

FIG. 3 illustrates an example of a transmission timeline 300 in accordance with aspects of the present disclosure. The transmission timeline 300 may implement aspects of the wireless communications systems 100 and 200 described with reference to FIGS. 1 and 2, respectively. For example, the transmission timeline 300 may be based on a configuration by a base station 105, and implemented by a UE 115, which may be examples of the corresponding devices described with reference to FIGS. 1 and 2, respectively. In some examples, the transmission timeline 300 may be applicable to implementations or instances when the UE 115 is configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming in 5G systems.

In the example illustrated in FIG. 3, the transmission timeline 300 may be applicable to implementations or instances when the UE 115 is configured to support uplink communications using multiple antenna panels. The UE 115 may also support beamforming operations, including beam sweeping operations to provide uplink communications over multiple directional beams using one or more antenna panels. In some examples, the UE 115 may support uplink data channel repetitions (e.g., PUSCH repetitions).

The transmission timeline 300 may include a slot 305. The UE 115 may be configured with a PUSCH repetition 310 and a PUSCH repetition 315 over (or during) the slot 305. Although the transmission timeline 300 is described with reference to a slot, the transmission timeline 300 may be applicable to other time resources, for example, such as a symbol, a minislot, a subframe, or a frame. In some examples, the PUSCH repetitions 310 may correspond to one directional beam, while the PUSCH repetitions 315 may correspond to another directional beam. The directional beam associated with the PUSCH repetitions 310 may be associated with a corresponding sounding reference signal (SRS) resource indicator (SRI), a transmission configuration indicator (TCI), a transmit precoding matrix indicator (TPMI), or an SRS set identifier, or any combination thereof. Similarly, the other directional beam associated with the PUSCH repetitions 315 may be associated with a corresponding different: SRI, TCI, TPMI, or SRS set identifier, or any combination thereof. Additionally, the directional beam associated with the PUSCH repetitions 310 may have a corresponding antenna panel, while the other directional beam associated with the PUSCH repetitions 315 may have a different corresponding antenna panel. The antenna panel can be an antenna group that may include multiple antenna ports. The PUSCH repetition 310 and the PUSCH repetition 315 may be scheduled by a same DCI to carry a same transport block or data repeatedly.

In the example illustrated in FIG. 3, the UE 115 may be configured to support a cyclic repetition of PUSCH repetitions. For example, the PUSCH repetition 310 and the PUSCH repetition 315 may be a cyclic repetition. That is, the PUSCH repetition 310 and the PUSCH repetition 315 may repeat in a cyclic pattern (e.g., every n number symbols). For example, the PUSCH repetition 310 may include a PUSCH 310-*a* and a PUSCH 310-*b*, and the PUSCH repetition 315 may include a PUSCH 315-*a* and a PUSCH 315-*b*. In the example illustrated in FIG. 3, the PUSCH 310 repetitions may interleave with the PUSCH repetitions 315. For example, the PUSCH 315-*a* may occur between the PUSCH 310-*a* and the PUSCH 310-*b*. Similarly, the PUSCH 310-*b* may occur between the PUSCH 315-*a* and the PUSCH 315-*b*.

Figure 4:
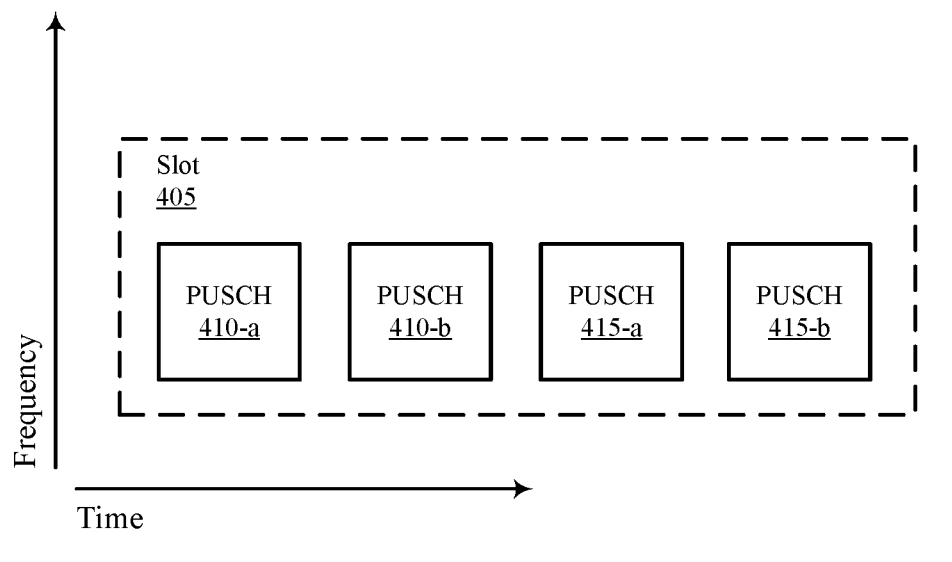

FIG. 4 illustrates an example of a transmission timeline 400 in accordance with aspects of the present disclosure. The transmission timeline 400 may implement aspects of the wireless communications systems 100 and 200 described with reference to FIGS. 1 and 2, respectively. For example, the transmission timeline 400 may be based on a configuration by a base station 105, and implemented by a UE 115, which may be examples of the corresponding devices described with reference to FIGS. 1 and 2, respectively. In some examples, the transmission timeline 400 may be applicable to implementations or instances when the UE 115 is configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming in 5G systems.

In the example illustrated in FIG. 4, the transmission timeline 400 may be applicable to implementations or instances when the UE 115 is configured to support uplink communications using multiple antenna panels. The UE 115 may also support beamforming operations, including beam sweeping operations to provide uplink communications over multiple directional beams using one or more antenna panels. In some examples, the UE 115 may support uplink data channel repetitions (e.g., PUSCH repetitions).

The transmission timeline 400 may include a slot 405. The UE 115 may be configured with a PUSCH repetition 410 and a PUSCH repetition 415 over (or during) the slot 405. Although the transmission timeline 400 is described with reference to a slot, the transmission timeline 400 may be applicable to other time resources, for example, such as a symbol, a minislot, a subframe, or a frame. In the example illustrated in FIG. 4, the UE 115 may be configured to support a sequential repetition of PUSCH repetitions. For example, the PUSCH repetition 410 and the PUSCH repetition 415 may be a sequential repetition. That is, the PUSCH repetition 410 and the PUSCH repetition 415 may repeat in a successive pattern. For example, the PUSCH repetition 410 may include a PUSCH 410-*a* and a PUSCH 410-*b* that may be consecutive in a time domain, and the PUSCH repetition 415 may include a PUSCH 415-*a* and a PUSCH 415-*b* that may also be consecutive in the time domain. Thus, repetition of PUSCH 410, 415 may be consecutive over slots.

In some examples, the PUSCH repetitions 410 may correspond to one directional beam, while the PUSCH repetitions 415 may correspond to another directional beam. The directional beam associated with the PUSCH repetitions 410 may be associated with a corresponding SRI, a TCI, a TPMI, or an SRS set identifier, or any combination thereof. Similarly, the other directional beam associated with the PUSCH repetitions 415 may be associated with a corresponding different: SRI, TCI, TPMI, or SRS set identifier, or any combination thereof. Additionally, the directional beam associated with the PUSCH repetitions 410 may have a corresponding antenna panel, while the other directional beam associated with the PUSCH repetitions 415 may have a different corresponding antenna panel. The antenna panel can be an antenna group that may include multiple antenna ports. The PUSCH repetition 410 and the PUSCH repetition 415 may be scheduled by a same DCI to carry a same transport block or data repeatedly.

Returning to FIG. 2, as demand for communication efficiency increases, some wireless communications systems, such as 4G and 5G systems, may be unable to support uplink operations (e.g., multiplexing uplink communications) over a repetition of some physical channels, such as PUCCH or PUSCH, or both, as well as with diverse multiple directional beams, among other examples. Various aspects of the described techniques relate to configuring the UE 115-*a* to multiplex uplink communications (e.g., UCI) over multiple PUSCH repetitions with diverse multiple directional beams, in the wireless communications system 200. Examples of transmission timelines that support multiplexing uplink directional communications over multiple PUSCH repetitions with diverse multiple directional beams are further described with reference to FIGS. 5 through 13.

Figure 5:
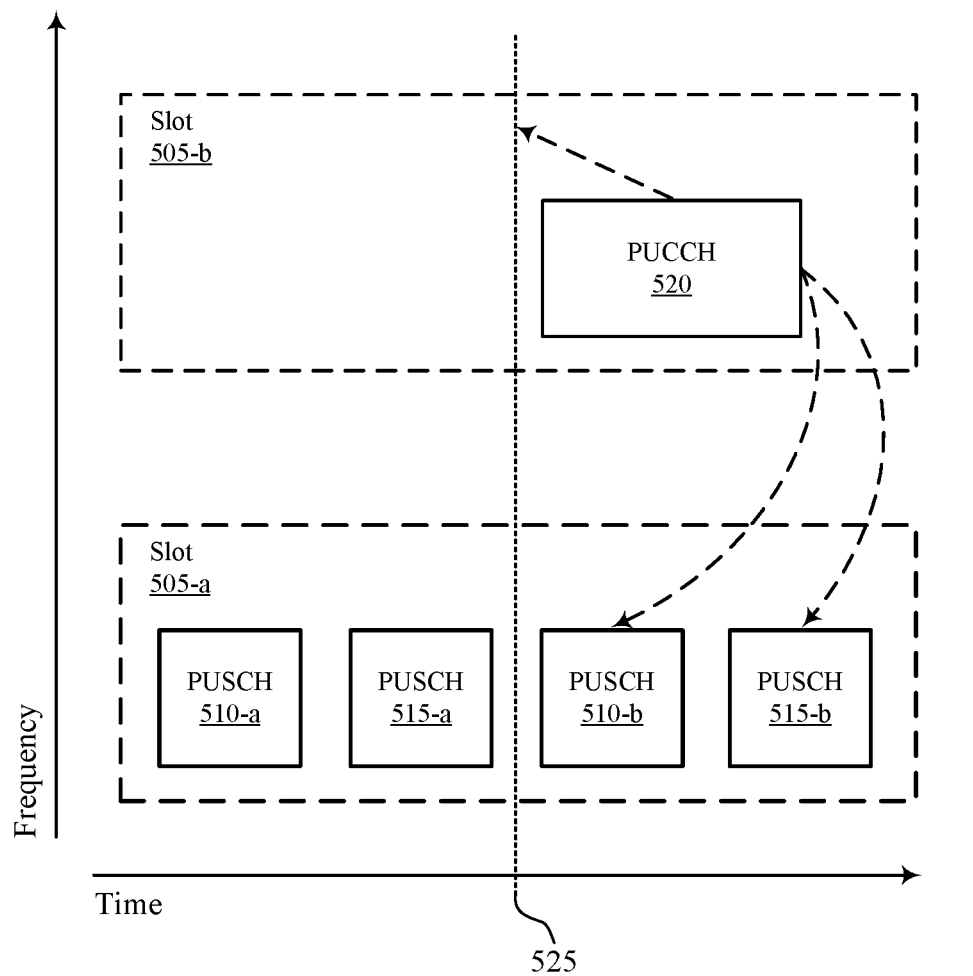

FIG. 5 illustrates an example of a transmission timeline 500 in accordance with aspects of the present disclosure. The transmission timeline 500 may implement aspects of the wireless communications systems 100 and 200 described with reference to FIGS. 1 and 2, respectively. For example, the transmission timeline 500 may be based on a configuration by a base station 105, and implemented by a UE 115, which may be examples of the corresponding devices described with reference to FIGS. 1 and 2, respectively. In some examples, the transmission timeline 500 may be applicable to implementations or instances when the UE 115 is configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming in 5G systems.

In the example illustrated in FIG. 5, the transmission timeline 500 may be applicable to implementations or instances when the UE 115 is configured to support uplink communications using multiple antenna panels. The UE 115 may also support beamforming operations, including beam sweeping operations to provide uplink communications over multiple directional beams using one or more antenna panels. The UE 115 may support uplink data channel repetitions (e.g., PUSCH repetitions). In the example illustrated in FIG. 5, the UE 115 may be configured to support a cyclic repetition of PUSCH repetitions 510, 515.

The UE 115 may determine a set of PUSCH repetitions 510 and a set of PUSCH repetitions 515. In some examples, the set of PUSCH repetitions 510 may correspond to a first PUSCH (e.g., a first uplink data channel), while the set of PUSCH repetitions 515 may correspond to a second PUSCH (e.g., a second uplink data channel). In some examples, the set of PUSCH repetitions 510 may correspond to a first directional beam (e.g., a first mmW beam), while the set of PUSCH repetitions 515 may correspond to a second directional beam (e.g., a second mmW beam) different from the first directional beam. The first directional beam may be associated with a corresponding SRI, a TCI, a TPMI, or an SRS set identifier, or any combination thereof. Similarly, the second directional beam may have be associated with a corresponding different: SRI, TCI, TPMI, or SRS set identifier, or any combination thereof. Additionally, the first directional beam may belong to a first antenna panel, while the second directional beam may belong to a second antenna panel different from the first antenna panel.

In some examples, the UE 115 may determine the set of PUSCH repetitions 510 and the set of PUSCH repetitions 515 for a slot 505-a. Although the transmission timeline 500 is described with reference to a slot, the transmission timeline 500 may be applicable to other time resources, for example, such as a symbol, a minislot, a subframe, or a frame. The set of PUSCH repetitions 510 and the set of PUSCH repetition 515 may, in some examples, be a cyclic repetition. That is, the set of PUSCH repetitions 510 and the set of PUSCH repetitions 515 may repeat in a cyclic pattern (e.g., every n number symbols). For example, the set of PUSCH repetitions 510 may include a PUSCH 510-a and a PUSCH 510-b, and the set of PUSCH repetitions 515 may include a PUSCH 515-a and a PUSCH 515-b. In the example illustrated in FIG. 5, the PUSCH 510 repetitions may interleave with the PUSCH repetitions 515. For example, the PUSCH 515-a may occur between the PUSCH 510-a and the PUSCH 510-b. Similarly, the PUSCH 510-b may occur between the PUSCH 515-a and the PUSCH 515-b. Thus, repetition of PUSCH may be nonconsecutive over slots. The antenna panel can be an antenna group that may include multiple antenna ports. The PUSCH repetition 510 and the PUSCH repetition 515 may be scheduled by a same DCI to carry a same transport block or data repeatedly.

The transmission timeline 500 may also include a PUCCH 520 during a slot 505-b. In some examples, the UE 115 may be configured to communicate UCI on the PUCCH 520. In the example illustrated in FIG. 5, the UE 115 may be configured to multiplex the UCI on two or more PUSCH associated with one or both of the set of PUSCH repetitions 510 and the set of PUSCH repetitions 515. The UE 115 may determine that one or both of a repetition associated with the set of PUSCH repetitions 510 and a repetition associated with the set of PUSCH repetitions 515 satisfies a timing boundary 525 (also referred to as a "timeline" or a "PUCCH timeline") associated with the PUCCH 520. As described herein, a repetition associated with a set of PUSCH repetitions 510, 515 may include a single instance of an uplink transmission via a PUSCH, and the set of PUSCH repetitions 510, 515 may include multiple instances of the uplink transmission (or different uplink transmissions) via the same PUSCH.

In the example illustrated in FIG. 5, the UE 115 may determine that the PUSCH 510-b (e.g., a second PUSCH repetition associated with the set of PUSCH repetitions 510) satisfies the timing boundary 525 associated with the PUCCH 520, and overlaps with the PUCCH 520. In some examples, the UE 115 may determine that one or both of a repetition (e.g., the PUSCH 510-a or the PUSCH 510-b) associated with the set of PUSCH repetitions 510 and a repetition (e.g., the PUSCH 515-a or the PUSCH 515-b) associated with the set of PUSCH repetitions 515 satisfies the timing boundary 525 based in part on determining an overlap between the PUCCH 520 and one or both of the repetition associated with the set of PUSCH repetitions 510 and the repetition associated with the set of PUSCH repetitions 515. The UE 115 may determine the overlap based in part on determining that a resource (e.g., one or more symbols) associated with the PUCCH 520 overlaps with one or both of resources (e.g., one or more symbols) associated with the repetition (e.g., the PUSCH 510-a or the PUSCH 510-b) associated with the set of PUSCH repetitions 510 and resources (e.g., one or more symbols) associated with the repetition (e.g., e.g., the PUSCH 515-a or the PUSCH 515-b) associated with the set of PUSCH repetitions 515. As described herein, an overlap may be a full overlap or a partial overlap. A full overlap may include that all symbols of a PUSCH overlap with all symbols of a PUCCH, or all symbols of the PUSCH overlap with one or more symbols of the PUCCH, or one or more symbols of the PUSCH overlap with all symbols of the PUCCH. A partial overlap may include that one or more symbols of a PUSCH overlap with one or more symbols of a PUCCH.

In the example illustrated in FIG. 5, the UE 115 may determine that one or more symbols associated with the PUSCH 510-b overlap with one or more symbols of the PUCCH 520. Additionally, the UE 115 may determine that one or more symbols associated with the PUSCH 515-b overlap with one or more symbols of the PUCCH 520. In some examples, the PUSCH 515-b (e.g., the second PUSCH repetition associated with the set of PUSCH repetitions 515) may or may not have to overlap with the PUCCH 520 for the UE 115 to multiplex the UCI on the PUSCH 510-b and the PUSCH 515-b. The UE 115 may thus multiplex UCI associated with the PUCCH 520 with the PUSCH 510-b and the PUSCH 515-b, and transmit the multiplexed UCI on the PUSCH 510-b and the PUSCH 515-b. Although the transmission timeline 500 is described with reference to the UE 115 multiplexing UCI associated with the PUCCH 520 with the PUSCH 510-b and the PUSCH 515-b, the transmission timeline 500 may be applicable to when the PUSCH 510-a satisfies a timing boundary associated with the PUCCH 520, etc. as described above, and thereby the UE 115 may multiplex the UCI associated with the PUCCH 520 with one or both of the PUSCH 510-a and the PUSCH 515-a.

By multiplexing UCI with multiple PUSCH repetitions, the UE 115 may extend uplink coverage for UCI, among other examples. Additionally, the UE 115 experience improvements in uplink directional communications when operating in 5G systems. In some examples, the UE 115 may experience improvements to resource usage, coverage enhancement and, in some examples, may experience enhanced efficiency for uplink operations, among other benefits when multiplexing UCI on PUSCH with disparate directional beams, among other examples.

Figure 6:
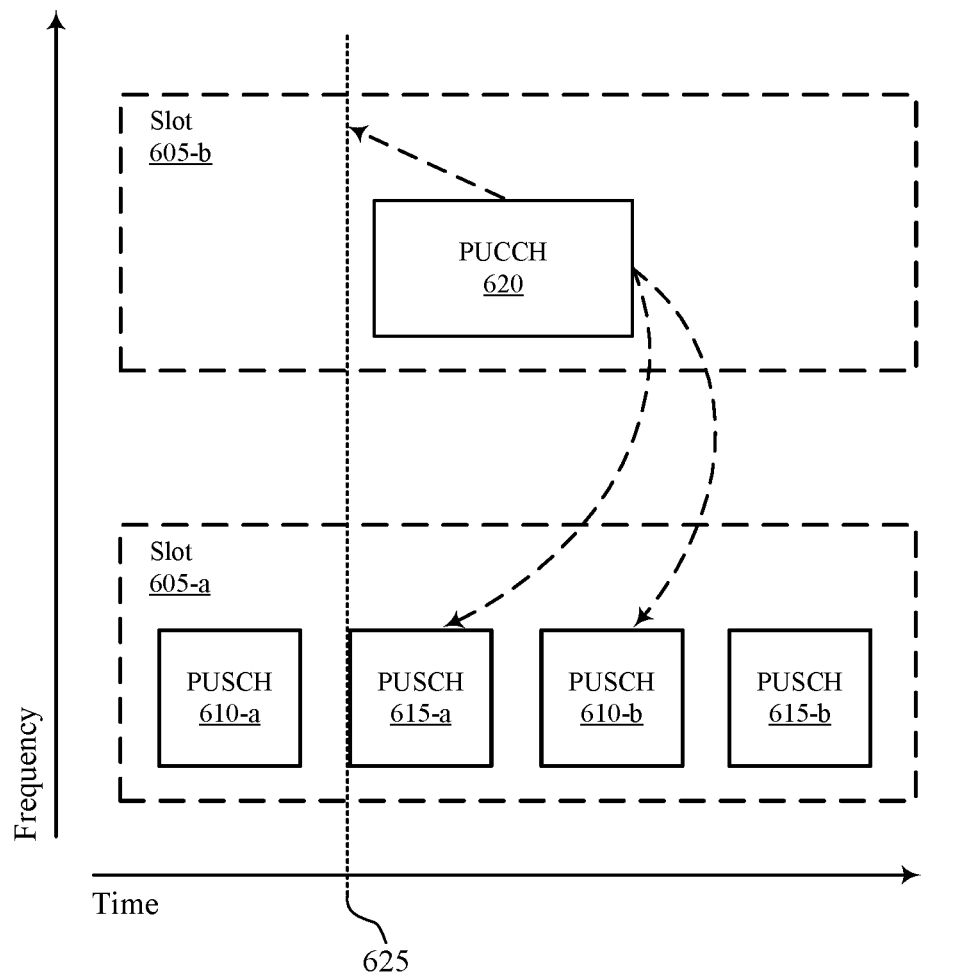

FIG. 6 illustrates an example of a transmission timeline 600 in accordance with aspects of the present disclosure. The transmission timeline 600 may implement aspects of the wireless communications systems 100 and 200 described with reference to FIGS. 1 and 2, respectively. For example, the transmission timeline 600 may be based on a configuration by a base station 105, and implemented by a UE 115, which may be examples of the corresponding devices described with reference to FIGS. 1 and 2, respectively. In some examples, the transmission timeline 600 may be applicable to implementations or instances when the UE 115 is configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming in 5G systems.

In the example illustrated in FIG. 6, the transmission timeline 600 may be applicable to implementations or instances when the UE 115 is configured to support uplink communications using multiple antenna panels. The UE 115 may also support beamforming operations, including beam sweeping operations to provide uplink communications over multiple directional beams using one or more antenna panels. In some examples, the UE 115 may support uplink data channel repetitions (e.g., PUSCH repetitions). For example, in the example illustrated in FIG. 6, the UE 115 may be configured to support a cyclic repetition of PUSCH repetitions 610, 615. The antenna panel can be an antenna group that may include multiple antenna ports. The PUSCH repetition 610 and the PUSCH repetition 615 may be scheduled by a same DCI to carry a same transport block or data repeatedly.

The UE 115 may determine a set of PUSCH repetitions 610 and a set of PUSCH repetitions 615. In some examples, the set of PUSCH repetitions 610 may correspond to a first PUSCH, while the set of PUSCH repetitions 615 may correspond to a second PUSCH. In some examples, the set of PUSCH repetitions 610 may correspond to a first directional beam, while the set of PUSCH repetitions 615 may correspond to a second directional beam different from the first directional beam. The first directional beam may be associated with a corresponding SRI, a TCI, a TPMI, or an SRS set identifier, or any combination thereof. Similarly, the second directional beam may be associated with a corresponding different: SRI, TCI, TPMI, or SRS set identifier, or any combination thereof. Additionally, the first directional beam may belong to a first antenna panel, while the second directional beam may belong to a second antenna panel different from the first antenna panel.

In some examples, the UE 115 may determine the set of PUSCH repetitions 610 and the set of PUSCH repetitions 615 for a slot 605-a. Although the transmission timeline 600 is described with reference to a slot, the transmission timeline 600 may be applicable to other time resources, for example, such as a symbol, a minislot, a subframe, or a frame. The set of PUSCH repetitions 610 and the set of PUSCH repetition 615 may, in some examples, be a cyclic repetition. That is, the set of PUSCH repetitions 610 and the set of PUSCH repetitions 615 may repeat in a cyclic pattern (e.g., every n number symbols). For example, the set of PUSCH repetitions 610 may include a PUSCH 610-a and a PUSCH 610-b, and the set of PUSCH repetitions 615 may include a PUSCH 615-a and a PUSCH 615-b. In the example illustrated in FIG. 6, the PUSCH 610 repetitions may interleave with the PUSCH repetitions 615. For example, the PUSCH 615-a may occur between the PUSCH 610-a and the PUSCH 610-b. Similarly, the PUSCH 610-b may occur between the PUSCH 615-a and the PUSCH 615-b. Thus, repetition of PUSCH may be nonconsecutive over slots.

The transmission timeline 600 may also include a PUCCH 620 during a slot 605-b. In some examples, the UE 115 may be configured to communicate UCI on the PUCCH 620. In the example illustrated in FIG. 6, the UE 115 may be configured to multiplex the UCI on two or more PUSCH associated with one or both of the set of PUSCH repetitions 610 and the set of PUSCH repetitions 615. The UE 115 may determine that one or both of a repetition associated with the set of PUSCH repetitions 610 and a repetition associated with the set of PUSCH repetitions 615 satisfies a timing boundary 625 (also referred to as a "timeline" or a "PUCCH timeline") associated with the PUCCH 620. A repetition associated with a set of PUSCH repetitions 610, 615 may include a single instance of an uplink transmission via a PUSCH, and the set of PUSCH repetitions 610, 615 may include multiple instances of the uplink transmission (or different uplink transmissions) via the same PUSCH.

The UE 115 may determine that one or both of a repetition (e.g., the PUSCH 610-a or the PUSCH 610-b) associated with the set of PUSCH repetitions 610 and a repetition (e.g., the PUSCH 615-a or the PUSCH 615-b) associated with the set of PUSCH repetitions 615 satisfies a timing boundary 625 based in part on determining an overlap between the PUCCH 620 and one or both of the repetition associated with the set of PUSCH repetitions 610 and the repetition associated with the set of PUSCH repetitions 615. The UE 115 may determine the overlap based in part on determining that a resource (e.g., one or more symbols) associated with the PUCCH 620 overlaps with one or both of resources (e.g., one or more symbols) associated with the repetition (e.g., the PUSCH 610-a or the PUSCH 610-b) associated with the set of PUSCH repetitions 610 and resources (e.g., one or more symbols) associated with the repetition (e.g., e.g., the PUSCH 615-a or the PUSCH 615-b) associated with the set of PUSCH repetitions 615.

An overlap may be a full overlap or a partial overlap. A full overlap may include that all symbols of a PUSCH overlap with all symbols of a PUCCH, or all symbols of the PUSCH overlap with one or more symbols of the PUCCH, or one or more symbols of the PUSCH overlap with all symbols of the PUCCH. A partial overlap may include that one or more symbols of a PUSCH overlap with one or more symbols of a PUCCH.

In the example illustrated in FIG. 6, the UE 115 may determine that the PUSCH 610-a (e.g., a first PUSCH repetition associated with the set of PUSCH repetitions 610) does not satisfy the timing boundary 625 associated with the PUCCH 620, and does not overlap with the PUCCH 620. For example, the UE 115 may determine that the PUSCH 610-a does not satisfy the timing boundary 625 associated with the PUCCH 620 and does not overlap with the PUCCH 620 based in part on a nonoverlap between the PUSCH 610-a and the PUCCH 620. That is, a nonoverlap between one or more symbols associated with the PUSCH 610-a and one or more symbols of the PUCCH 620. As a result, the UE 115 may refrain from multiplexing the UCI with the PUSCH 610-a.

A nonoverlap may be a full nonoverlap or a partial nonoverlap. A full nonoverlap may include that all symbols of a PUSCH are nonoverlapping with all symbols of a PUCCH, or all symbols of the PUSCH are nonoverlapping with one or more symbols of the PUCCH, or one or more symbols of the PUSCH are nonoverlapping with all symbols of the PUCCH. A partial nonoverlap may include that one or more symbols of a PUSCH are nonoverlapping with one or more symbols of a PUCCH.

The UE 115 may determine whether one or more remaining PUSCH of the set of PUSCH repetitions 610 or whether a PUSCH of the set of PUSCH repetitions 615 satisfies the timing boundary 625. For example, the UE 115 may determine that the PUSCH 615-a (e.g., a first PUSCH repetition associated with the set of PUSCH repetitions 615) satisfies the timing boundary 625 associated with the PUCCH 620, and overlaps with the PUCCH 620. The UE 115 may determine that one or more symbols associated with the PUSCH 615-a overlap with one or more symbols of the PUCCH 620, and thereby determine that the PUSCH 615-a overlaps with the PUCCH 620.

Additionally or alternatively, the UE 115 may determine that the PUSCH 610-b (e.g., a second PUSCH repetition associated with the set of PUSCH repetitions 610) overlaps with the PUCCH 620. For example, the UE 115 may determine that one or more symbols associated with the PUSCH 610-b overlap with one or more symbols of the PUCCH 620. In some examples, the PUSCH 610-b (e.g., the second PUSCH repetition associated with the set of PUSCH repetitions 610) may or may not have to overlap with the PUCCH 620 for the UE 115 to multiplex the UCI on the PUSCH 615-a and the PUSCH 610-b. The UE 115 may thus multiplex UCI associated with the PUCCH 620 with the PUSCH 615-a and the PUSCH 610-b, and transmit the multiplexed UCI on the PUSCH 615-a and the PUSCH 610-b. Although the transmission timeline 600 is described with reference to the UE 115 multiplexing UCI associated with the PUCCH 620 with the PUSCH 615-a and the PUSCH 610-b, the transmission timeline 600 may be applicable to when the PUSCH 610-a satisfies the timing boundary 625 associated with the PUCCH 620, etc., and thereby the UE 115 may multiplex the UCI associated with the PUCCH 620 with one or both of the PUSCH 610-a and the PUSCH 615-a.

By multiplexing UCI with multiple PUSCH repetitions, the UE 115 may extend uplink coverage for UCI, among other examples. Additionally, the UE 115 experience improvements in uplink directional communications when operating in 5G systems. In some examples, the UE 115 may experience improvements to resource usage, coverage enhancement and, in some examples, may experience enhanced efficiency for uplink operations, among other benefits when multiplexing UCI on PUSCH with disparate directional beams, among other examples.

Figure 7:
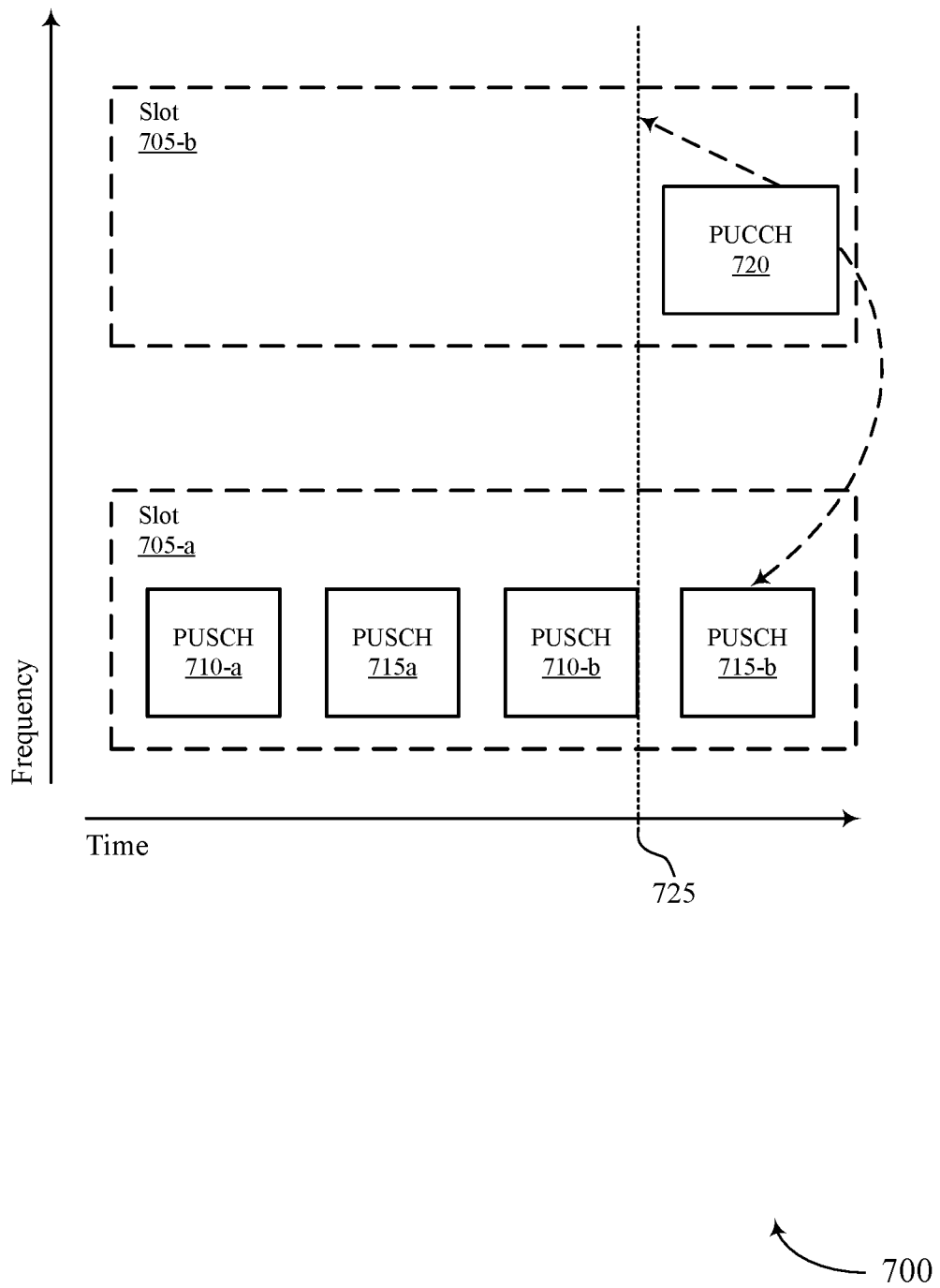

FIG. 7 illustrates an example of a transmission timeline 700 in accordance with aspects of the present disclosure. The transmission timeline 700 may implement aspects of the wireless communications systems 100 and 200 described with reference to FIGS. 1 and 2, respectively. For example, the transmission timeline 700 may be based on a configuration by a base station 105, and implemented by a UE 115, which may be examples of the corresponding devices described with reference to FIGS. 1 and 2, respectively. In some examples, the transmission timeline 700 may be applicable to implementations or instances when the UE 115 is configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming in 5G systems.

In the example illustrated in FIG. 7, the transmission timeline 700 may be applicable to implementations or instances when the UE 115 is configured to support uplink communications using multiple antenna panels. The UE 115 may also support beamforming operations, including beam sweeping operations to provide uplink communications over multiple directional beams using one or more antenna panels. In some examples, the UE 115 may support uplink data channel repetitions (e.g., PUSCH repetitions). For example, in the example illustrated in FIG. 7, the UE 115 may be configured to support a cyclic repetition of PUSCH repetitions 710, 715.

The UE 115 may determine a set of PUSCH repetitions 710 and a set of PUSCH repetitions 715. In some examples, the set of PUSCH repetitions 710 may correspond to a first PUSCH (e.g., a first uplink data channel), while the set of PUSCH repetitions 715 may correspond to a second PUSCH (e.g., a second uplink data channel). The set of PUSCH repetitions 710 may correspond to a first directional beam (e.g., a first mmW beam), while the set of PUSCH repetitions 715 may correspond to a second directional beam (e.g., a second mmW beam) different from the first directional beam. The first directional beam may be associated with a corresponding SRI, a TCI, a TPMI, or an SRS set identifier, or any combination thereof. Similarly, the second directional beam may be associated with a corresponding different: SRI, TCI, TPMI, or SRS set identifier, or any combination thereof. Additionally, the first directional beam may belong to a first antenna panel, while the second directional beam may belong to a second antenna panel different from the first antenna panel.

In some examples, the UE 115 may determine the set of PUSCH repetitions 710 and the set of PUSCH repetitions 715 for a slot 705-a. Although the transmission timeline 700 is described with reference to a slot, the transmission timeline 700 may be applicable to other time resources, for example, such as a symbol, a minislot, a subframe, or a frame. The set of PUSCH repetitions 710 and the set of PUSCH repetition 715 may, in some examples, be a cyclic repetition. That is, the set of PUSCH repetitions 710 and the set of PUSCH repetitions 715 may repeat in a cyclic pattern (e.g., every n number symbols). For example, the set of PUSCH repetitions 710 may include a PUSCH 710-a and a PUSCH 710-b, and the set of PUSCH repetitions 715 may include a PUSCH 715-a and a PUSCH 715-b. In the example illustrated in FIG. 7, the PUSCH 710 repetitions may interleave with the PUSCH repetitions 715. For example, the PUSCH 715-a may occur between the PUSCH 710-a and the PUSCH 710-b. Similarly, the PUSCH 710-b may occur between the PUSCH 715-a and the PUSCH 715-b. Thus, repetition of PUSCH may be nonconsecutive over slots.

The transmission timeline 700 may also include a PUCCH 720 during a slot 705-b. In some examples, the UE 115 may be configured to communicate UCI on the PUCCH 720. In the example illustrated in FIG. 7, the UE 115 may be configured to multiplex the UCI on two or more PUSCH associated with one or both of the set of PUSCH repetitions 710 and the set of PUSCH repetitions 715. The UE 115 may determine that one or both of a repetition associated with the set of PUSCH repetitions 710 and a repetition associated with the set of PUSCH repetitions 715 satisfies a timing boundary 725 (also referred to as a "timeline" or a "PUCCH timeline") associated with the PUCCH 720. A repetition associated with a set of PUSCH repetitions 710, 715 may include a single instance of an uplink transmission via a PUSCH, and the set of PUSCH repetitions 710, 715 may include multiple instances of the uplink transmission (or different uplink transmissions) via the same PUSCH.

The UE 115 may determine that one or both of a repetition (e.g., the PUSCH 710-*a* or the PUSCH 710-*b*) associated with the set of PUSCH repetitions 710 and a repetition (e.g., the PUSCH 715-*a* or the PUSCH 715-*b*) associated with the set of PUSCH repetitions 715 satisfies a timing boundary 725 based in part on determining an overlap between the PUCCH 720 and one or both of the repetition associated with the set of PUSCH repetitions 710 and the repetition associated with the set of PUSCH repetitions 715. The UE 115 may determine the overlap based in part on determining that a resource (e.g., one or more symbols) associated with the PUCCH 720 overlaps with one or both of resources (e.g., one or more symbols) associated with the repetition (e.g., the PUSCH 710-*a* or the PUSCH 710-*b*) associated with the set of PUSCH repetitions 710 and resources (e.g., one or more symbols) associated with the repetition (e.g., e.g., the PUSCH 715-*a* or the PUSCH 715-*b*) associated with the set of PUSCH repetitions 715.

An overlap may be a full overlap or a partial overlap. A full overlap may include that all symbols of a PUSCH overlap with all symbols of a PUCCH, or all symbols of the PUSCH overlap with one or more symbols of the PUCCH, or one or more symbols of the PUSCH overlap with all symbols of the PUCCH. A partial overlap may include that one or more symbols of a PUSCH overlap with one or more symbols of a PUCCH.

In the example illustrated in FIG. 7, the UE 115 may determine that the PUSCH 710-*a* and the PUSCH 710-*b* (e.g., a first PUSCH repetition and a second PUSCH repetition associated with the set of PUSCH repetitions 710) does not satisfy the timing boundary 725 associated with the PUCCH 720, and does not overlap with the PUCCH 720. For example, the UE 115 may determine that the PUSCH 710-*a* and the PUSCH 710-*b* does not satisfy the timing boundary 725 associated with the PUCCH 720 and does not overlap with the PUCCH 720 based in part on a nonoverlap between the PUCCH 720 and one or both of the PUSCH 710-*a* and the PUSCH 710-*b*. That is, a nonoverlap between one or more symbols associated with the PUCCH 720 and one or more symbols of one or both of the PUSCH 710-*a* and the PUSCH 710-*b*.

The UE 115 may thus refrain from multiplexing the UCI with the PUSCH 710-*a* and the PUSCH 710-*b*. Additionally, the UE 115 may determine that the PUSCH 715-*a* (e.g., a first PUSCH repetition associated with the set of PUSCH repetitions 715) does not satisfy the timing boundary 725 associated with the PUCCH 720, and does not overlap with the PUCCH 720.

A nonoverlap may be a full nonoverlap or a partial nonoverlap. A full nonoverlap may include that all symbols of a PUSCH are nonoverlapping with all symbols of a PUCCH, or all symbols of the PUSCH are nonoverlapping with one or more symbols of the PUCCH, or one or more symbols of the PUSCH are nonoverlapping with all symbols of the PUCCH. A partial nonoverlap may include that one or more symbols of a PUSCH are nonoverlapping with one or more symbols of a PUCCH.

The UE 115 may determine whether one or more remaining PUSCH of the set of PUSCH repetitions 710 or whether a PUSCH of the set of PUSCH repetitions 715 satisfies the timing boundary 725. For example, the UE 115 may determine that the PUSCH 715-*b* (e.g., a second PUSCH repetition associated with the set of PUSCH repetitions 715) satisfies the timing boundary 725 associated with the PUCCH 720, and overlaps with the PUCCH 720. The UE 115 may determine that one or more symbols associated with the PUSCH 715-*b* overlap with one or more symbols of the PUCCH 720, and thereby determine that the PUSCH 715-*b* overlaps with the PUCCH 720. The UE 115 may thus multiplex UCI associated with the PUCCH 720 with the PUSCH 715-*b*, and transmit the multiplexed UCI on the PUSCH 715-*b*. In some examples, the UE 115 may drop the PUSCH 715-*b* (e.g., refrain from multiplexing the UCI on the PUSCH 715-*b*), and transmit the UCI on the PUCCH 720. Therefore, the UE 115 may be configured to multiplex UCI on a single PUSCH repetition of a set of PUSCH repetitions, or drop (e.g., refrain from multiplexing the UCI) the single PUSCH repetition and transmit the UCI via a PUCCH. The dropped PUSCH repetition may be a last and only PUSCH repetition satisfying the timing boundary 725 for UCI multiplexing.

By multiplexing UCI with multiple PUSCH repetitions, the UE 115 may extend uplink coverage for UCI, among other examples. Additionally, the UE 115 experience improvements in uplink directional communications when operating in 5G systems. In some examples, the UE 115 may experience improvements to resource usage, coverage enhancement and, in some examples, may experience enhanced efficiency for uplink operations, among other benefits when multiplexing UCI on PUSCH with disparate directional beams, among other examples.

Figure 8:
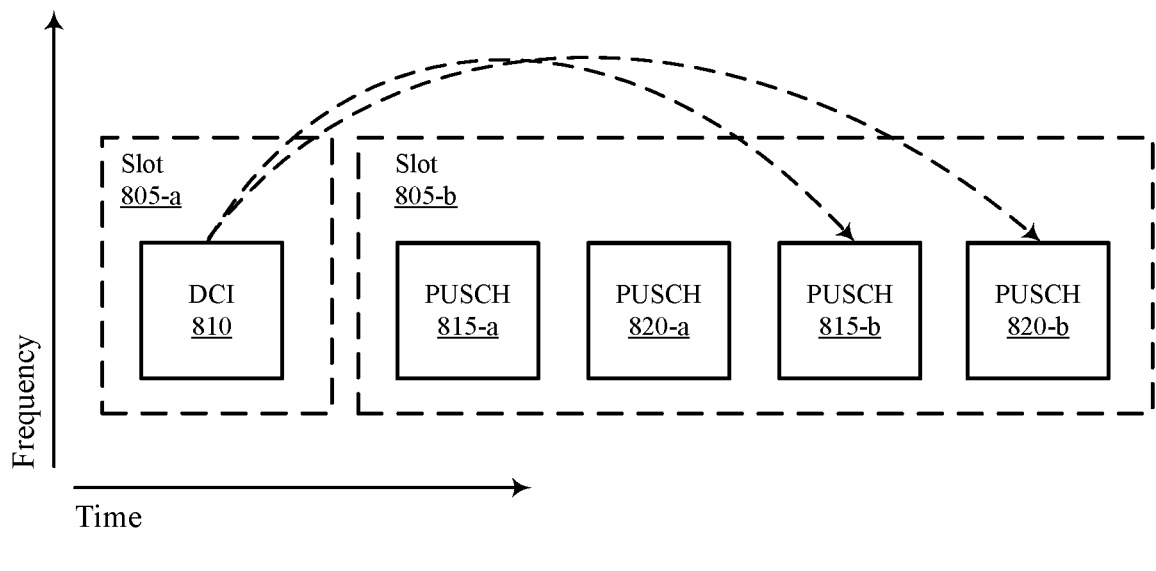

FIG. 8 illustrates an example of a transmission timeline 800 in accordance with aspects of the present disclosure. The transmission timeline 800 may implement aspects of the wireless communications systems 100 and 200 described with reference to FIGS. 1 and 2, respectively. For example, the transmission timeline 800 may be based on a configuration by a base station 105, and implemented by a UE 115, which may be examples of the corresponding devices described with reference to FIGS. 1 and 2, respectively. In some examples, the transmission timeline 800 may be applicable to implementations or instances when the UE 115 is configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming in 5G systems.

In the example illustrated in FIG. 8, the transmission timeline 800 may be applicable to implementations or instances when the UE 115 is configured to support CSI operations, for example, such as providing CSI reports. In some examples, the UE 115 may support uplink data channel repetitions (e.g., PUSCH repetitions). For example, the transmission timeline 800 may be applicable to implementations or instances when the UE 115 is configured to provide CSI reports on PUSCH repetitions to extend PUSCH coverage for the CSI reports. In some examples, the transmission timeline 800 may be applicable to implementations or instances when the UE 115 is configured to provide CSI reports using multiple antenna panels. For example, the UE 115 may support beamforming operations, including beam sweeping operations to provide CSI reports over multiple directional beams using one or more antenna panels.

A CSI report may include one or more CSI parameters. In some examples, the UE 115 may generate the CSI report including the one more CSI parameters based on measuring one or more reference signals, such as a synchronization signal physical broadcast channel (SS/PBCH) block (SSB) or a CSI reference signal (CSI-RS). For example, a base station 105 may transmit, and the UE 115 may receive, one or more SSBs or CSI-RS via directional communications between the base station 105 and the UE 115. The one or more CSI parameters may include one or more of a channel quality indicator (CQI), a precoding matrix indicator (PMI), or a CSI reference signal (CSI-RS) indicator (CRI). In some other examples, the one or more CSI parameters may additionally or alternatively include one or more of a synchronization signal physical broadcast channel (SS/PBCH) block resource indicator (SSBRI), a layer indicator (LI), a rank indicator (RI), or a layer one reference signal received power (L1-RSRP).

The CSI report may be an aperiodic CSI report, and the UE 115 may transmit the aperiodic CSI report using a PUCCH or a DCI scheduled PUSCH. For example, the UE 115 may receive, during a slot 805-a, a DCI message 810 scheduling one or more PUSCH of a set of PUSCH repetitions 815, 820 for the aperiodic CSI report (e.g., scheduling the UE 115 to transmit or multiplex the aperiodic CSI report on the one or more PUSCH repetitions). Based in part on the DCI message 810, the UE 115 may multiplex the aperiodic CSI report on the one or more PUSCH repetitions of the set of PUSCH repetitions 815, 820. The transmission timeline 800 may also be applicable to implementations or instances when the UE 115 is configured to support a cyclic repetition of the set of PUSCH repetitions 815, 820. Although the transmission timeline 800 is described with reference to a slot, the transmission timeline 800 may be applicable to other time resources, for example, such as a symbol, a minislot, a subframe, or a frame.

The UE 115 may determine a set of PUSCH repetitions 815 and a set of PUSCH repetitions 820. In some examples, the set of PUSCH repetitions 815 may correspond to a first PUSCH (e.g., a first uplink data channel), while the set of PUSCH repetitions 820 may correspond to a second PUSCH (e.g., a second uplink data channel). The set of PUSCH repetitions 815 may correspond to a first directional beam (e.g., a first mmW beam), while the set of PUSCH repetitions 820 may correspond to a second directional beam (e.g., a second mmW beam) different from the first directional beam. The UE 115 may, in some examples, multiplex the aperiodic CSI report on the one or more PUSCH repetitions of the set of PUSCH repetitions 815, 820 with different directional beams. The first directional beam may be associated with a corresponding SRI, a TCI, a TPMI, or an SRS set identifier, or any combination thereof. Similarly, the second directional beam may be associated with a corresponding different: SRI, TCI, TPMI, or SRS set identifier, or any combination thereof. Additionally, the first directional beam may belong to a first antenna panel, while the second directional beam may belong to a second antenna panel different from the first antenna panel.

In some examples, the UE 115 may determine the set of PUSCH repetitions 815 and the set of PUSCH repetitions 820 for a slot 805-b. Although the transmission timeline 800 is described with reference to a slot, the transmission timeline 800 may be applicable to other time resources, for example, such as a symbol, a minislot, a subframe, or a frame. The set of PUSCH repetitions 815 and the set of PUSCH repetition 820 may, in some examples, be a cyclic repetition. That is, the set of PUSCH repetitions 815 and the set of PUSCH repetitions 820 may repeat in a cyclic pattern (e.g., every n number symbols). For example, the set of PUSCH repetitions 815 may include a PUSCH 815-a and a PUSCH 815-b, and the set of PUSCH repetitions 820 may include a PUSCH 820-a and a PUSCH 820-b. In the example illustrated in FIG. 8, the PUSCH 815 repetitions may interleave with the PUSCH repetitions 820. For example, the PUSCH 820-a may occur between the PUSCH 815-a and the PUSCH 815-b. Similarly, the PUSCH 815-b may occur between the PUSCH 820-a and the PUSCH 820-b. Thus, repetition of PUSCH may be nonconsecutive over slots.

In the example illustrated in FIG. 8, the UE 115 may multiplex an aperiodic CSI report on one or both of the PUSCH 815-b and the PUSCH 820-b. In some examples, the UE 115 may multiplex the aperiodic CSI report on one or both of the PUSCH 815-b and the PUSCH 820-b based in part on the DCI message 810. That is, the DCI message 810 may activate (e.g., schedule) one or both of the PUSCH 815-b and the PUSCH 820-b for the UE 115 to multiplex the aperiodic CSI report on one or both of the PUSCH 815-b and the PUSCH 820-b. The PUSCH 815-b and the PUSCH 820-b may be a last two PUSCH repetitions associated with the slot 805-b. In some other examples, the UE 115 may multiplex the aperiodic CSI report on one or both of the PUSCH 815-a and the PUSCH 820-a. The PUSCH 815-a and the PUSCH 820-a may be a first two PUSCH repetitions associated with the slot 805-b. Accordingly, the UE 115 may multiplex the aperiodic CSI report on two or more consecutive PUSCH repetitions for a cyclic repetition, as illustrated in FIG. 8.

By multiplexing an aperiodic CSI report with multiple PUSCH repetitions, the UE 115 may extend uplink coverage for aperiodic CSI reporting, among other examples. Additionally, the UE 115 experience improvements in uplink directional communications when operating in 5G systems. In some examples, the UE 115 may experience improvements to resource usage, coverage enhancement and, in some examples, may experience enhanced efficiency for uplink operations, among other benefits when multiplexing aperiodic CSI reports on PUSCH with disparate directional beams, among other examples.

Figure 9:
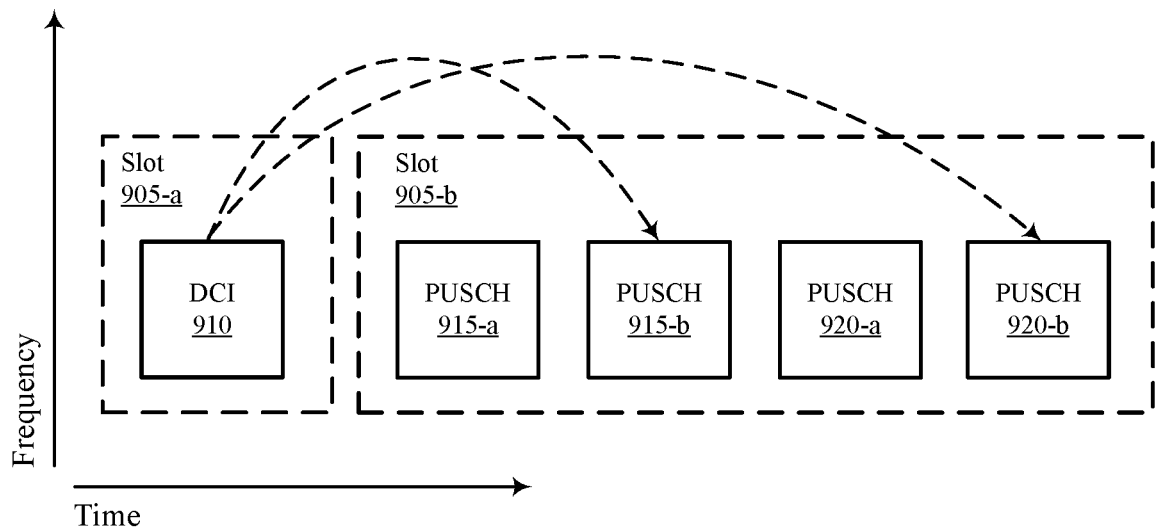

FIG. 9 illustrates an example of a transmission timeline 900 in accordance with aspects of the present disclosure. The transmission timeline 900 may implement aspects of the wireless communications systems 100 and 200 described with reference to FIGS. 1 and 2, respectively. For example, the transmission timeline 900 may be based on a configuration by a base station 105, and implemented by a UE 115, which may be examples of the corresponding devices described with reference to FIGS. 1 and 2, respectively. In some examples, the transmission timeline 900 may be applicable to implementations or instances when the UE 115 is configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming in 5G systems.

In the example illustrated in FIG. 9, the transmission timeline 900 may be applicable to implementations or instances when the UE 115 is configured to support CSI operations, for example, such as providing CSI reports. In some examples, the UE 115 may support uplink data channel repetitions (e.g., PUSCH repetitions). For example, the transmission timeline 900 may be applicable to implementations or instances when the UE 115 is configured to provide CSI reports on PUSCH repetitions to extend PUSCH coverage for the CSI reports. In some examples, the transmission timeline 900 may be applicable to implementations or instances when the UE 115 is configured to provide CSI reports using multiple antenna panels. For example, the UE 115 may support beamforming operations, including beam sweeping operations to provide CSI reports over multiple directional beams using one or more antenna panels.

A CSI report may include one or more CSI parameters. In some examples, the UE 115 may generate the CSI report including the one more CSI parameters based on measuring one or more reference signals, such as an SSB or a CSI-RS. For example, a base station 105 may transmit, and the UE 115 may receive, one or more SSBs or CSI-RS via directional communications between the base station 105 and the UE 115. The one or more CSI parameters may include one or more of a CQI, a PMI, or a CRI. In some other examples, the one or more CSI parameters may additionally or alternatively include one or more of a SSBRI, a LI, a RI, or a L1-RSRP.

The CSI report may be an aperiodic CSI report, and the UE 115 may transmit the aperiodic CSI report using a PUCCH or a DCI scheduled PUSCH. For example, the UE 115 may receive, during a slot 905-a, a DCI message 910 scheduling one or more PUSCH of a set of PUSCH repetitions 915, 920 for the aperiodic CSI report (e.g., scheduling the UE 115 to transmit or multiplex the aperiodic CSI report on the one or more PUSCH repetitions). Based in part on the DCI message 910, the UE 115 may multiplex the aperiodic CSI report on the one or more PUSCH repetitions of the set of PUSCH repetitions 915, 920. The transmission timeline 900 may also be applicable to implementations or instances when the UE 115 is configured to support a sequential repetition of the set of PUSCH repetitions 915, 920. Although the transmission timeline 900 is described with reference to a slot, the transmission timeline 900 may be applicable to other time resources, for example, such as a symbol, a minislot, a subframe, or a frame.

The UE 115 may determine a set of PUSCH repetitions 915 and a set of PUSCH repetitions 920. In some examples, the set of PUSCH repetitions 915 may correspond to a first PUSCH (e.g., a first uplink data channel), while the set of PUSCH repetitions 920 may correspond to a second PUSCH (e.g., a second uplink data channel). The set of PUSCH repetitions 915 may correspond to a first directional beam (e.g., a first mmW beam), while the set of PUSCH repetitions 920 may correspond to a second directional beam (e.g., a second mmW beam) different from the first directional beam. The UE 115 may, in some examples, multiplex the aperiodic CSI report on the one or more PUSCH repetitions of the set of PUSCH repetitions 915, 920 with different directional beams. The first directional beam may be associated with a corresponding SRI, a TCI, a TPMI, or an SRS set identifier, or any combination thereof. Similarly, the second directional beam may be associated with a corresponding different: SRI, TCI, TPMI, or SRS set identifier, or any combination thereof. Additionally, the first directional beam may belong to a first antenna panel, while the second directional beam may belong to a second antenna panel different from the first antenna panel.

In some examples, the UE 115 may determine the set of PUSCH repetitions 915 and the set of PUSCH repetitions 920 for a slot 905-b. Although the transmission timeline 900 is described with reference to a slot, the transmission timeline 900 may be applicable to other time resources, for example, such as a symbol, a minislot, a subframe, or a frame. The set of PUSCH repetitions 915 and the set of PUSCH repetitions 920 may, in some examples, be a sequential repetition. That is, set of PUSCH repetitions 915 and the set of PUSCH repetition 920 may repeat in a successive pattern. For example, the set of PUSCH repetitions 920 may include a PUSCH 915-a and a PUSCH 915-b that may be consecutive in a time domain, and the set of PUSCH repetitions 920 may include a PUSCH 920-a and a PUSCH 920-b that may also be consecutive in the time domain. Thus, repetition of PUSCH 915, 920 may be consecutive over slots.

In the example illustrated in FIG. 9, the UE 115 may multiplex an aperiodic CSI report on one or both of the PUSCH 915-b and the PUSCH 920-b. In some examples, the UE 115 may multiplex the aperiodic CSI report on one or both of the PUSCH 915-b and the PUSCH 920-b based in part on the DCI message 910. That is, the DCI message 910 may activate (e.g., schedule) one or both of the PUSCH 915-b and the PUSCH 920-b for the UE 115 to multiplex the aperiodic CSI report on one or both of the PUSCH 915-b and the PUSCH 920-b. The PUSCH 915-b and the PUSCH 920-b may be two nonconsecutive PUSCH repetitions associated with the slot 905-b.

In some other examples, the UE 115 may multiplex the aperiodic CSI report on one or both of the PUSCH 915-a and the PUSCH 920-a. In some examples, the UE 115 may multiplex the aperiodic CSI report on one or both of the PUSCH 915-a and the PUSCH 920-a based in part on the DCI message 910. That is, the DCI message 910 may activate (e.g., schedule) one or both of the PUSCH 915-a and the PUSCH 920-a for the UE 115 to multiplex the aperiodic CSI report on one or both of the PUSCH 915-a and the PUSCH 920-a. The PUSCH 915-a and the PUSCH 920-a may be two nonconsecutive PUSCH repetitions associated with the slot 905-b. Accordingly, the UE 115 may multiplex the aperiodic CSI report on two or more nonconsecutive PUSCH repetitions for a sequential repetition, as illustrated in FIG. 9.

By multiplexing an aperiodic CSI report with multiple PUSCH repetitions, the UE 115 may extend uplink coverage for aperiodic CSI reporting, among other examples. Additionally, the UE 115 experience improvements in uplink directional communications when operating in 5G systems. In some examples, the UE 115 may experience improvements to resource usage, coverage enhancement and, in some examples, may experience enhanced efficiency for uplink operations, among other benefits when multiplexing aperiodic CSI reports on PUSCH with disparate directional beams, among other examples.

Figure 10:
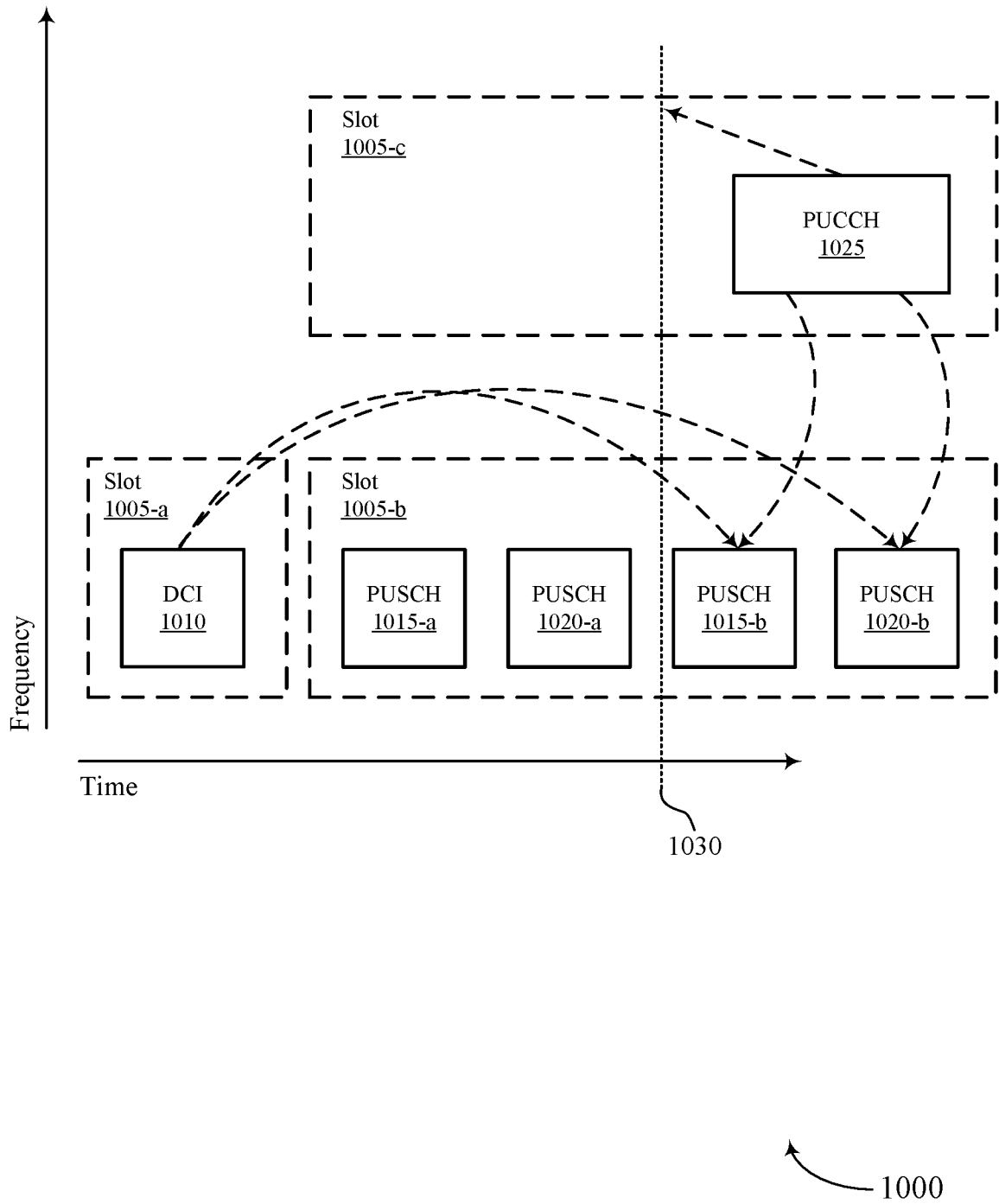

FIG. 10 illustrates an example of a transmission timeline 1000 in accordance with aspects of the present disclosure. The transmission timeline 1000 may implement aspects of the wireless communications systems 100 and 200 described with reference to FIGS. 1 and 2, respectively. For example, the transmission timeline 1000 may be based on a configuration by a base station 105, and implemented by a UE 115, which may be examples of the corresponding devices described with reference to FIGS. 1 and 2, respectively. In some examples, the transmission timeline 1000 may be applicable to implementations or instances when the UE 115 is configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming in 5G systems.

In the example illustrated in FIG. 10, the transmission timeline 1000 may be applicable to implementations or instances when the UE 115 is configured to support CSI operations, for example, such as providing CSI reports. In some examples, the UE 115 may support uplink data channel repetitions (e.g., PUSCH repetitions). For example, the transmission timeline 1000 may be applicable to implementations or instances when the UE 115 is configured to provide CSI reports on PUSCH repetitions to extend PUSCH coverage for the CSI reports. In some examples, the transmission timeline 1000 may be applicable to implementations or instances when the UE 115 is configured to provide CSI reports using multiple antenna panels. For example, the UE 115 may support beamforming operations, including beam sweeping operations to provide CSI reports over multiple directional beams using one or more antenna panels.

A CSI report may include one or more CSI parameters. In some examples, the UE 115 may generate the CSI report including the one more CSI parameters based on measuring one or more reference signals, such as SSB or a CSI-RS. For example, a base station 105 may transmit, and the UE 115 may receive, one or more SSBs or CSI-RS via directional communications between the base station 105 and the UE 115. The one or more CSI parameters may include one or more of a CQI, a PMI, or a CRI. In some other examples, the one or more CSI parameters may additionally or alternatively include one or more of a SSBRI, a LI, a RI, or a L1-RSRP.

The CSI report may be an aperiodic CSI report, and the UE 115 may transmit the aperiodic CSI report using a PUCCH or a DCI activated PUSCH. For example, the UE 115 may receive, during a slot 1005-a, a DCI message 1010 activating one or more PUSCH of a set of PUSCH repetitions 1015, 1020 for the aperiodic CSI report (e.g., scheduling the UE 115 to transmit or multiplex the aperiodic CSI report on the one or more PUSCH repetitions). Based in part on the DCI message 1010, the UE 115 may multiplex the aperiodic CSI report on the one or more PUSCH repetitions of the set of PUSCH repetitions 1015, 1020. The transmission timeline 1000 may also be applicable to implementations or instances when the UE 115 is configured to support a cyclic repetition of the set of PUSCH repetitions 1015, 1020. Although the transmission timeline 1000 is described with reference to a slot, the transmission timeline 1000 may be applicable to other time resources, for example, such as a symbol, a minislot, a subframe, or a frame.

The UE 115 may determine a set of PUSCH repetitions 1015 and a set of PUSCH repetitions 1020. In some examples, the set of PUSCH repetitions 1015 may correspond to a first PUSCH (e.g., a first uplink data channel), while the set of PUSCH repetitions 1020 may correspond to a second PUSCH (e.g., a second uplink data channel). The set of PUSCH repetitions 1015 may correspond to a first directional beam (e.g., a first mmW beam), while the set of PUSCH repetitions 1020 may correspond to a second directional beam (e.g., a second mmW beam) different from the first directional beam. The set of PUSCH repetitions 1015 and the set of PUSCH repetitions 1020 may be scheduled by a same DCI to transmit a same transport block or data repeatedly. A total repetition number be indicated by the scheduling DCI with the number of repetitions associated with time domain resource allocation (TDRA). The scheduling DCI may also trigger aperiodic CSI reports to be multiplexed on all the repetitions scheduled by the DCI message. In other words, the number of repetitions associated in TDRA indicated by the DCI message may not apply to aperiodic CSI reports. The UE 115 may, in some examples, multiplex the aperiodic CSI report on the one or more PUSCH repetitions of the set of PUSCH repetitions 1015, 1020 with different directional beams. The first directional beam may be associated with a corresponding SRI, a TCI, a TPMI, or an SRS set identifier, or any combination thereof. Similarly, the second directional beam may be associated with a corresponding different: SRI, TCI, TPMI, or SRS set identifier, or any combination thereof. Additionally, the first directional beam may belong to a first antenna panel, while the second directional beam may belong to a second antenna panel different from the first antenna panel.

In some examples, the UE 115 may determine the set of PUSCH repetitions 1015 and the set of PUSCH repetitions 1020 for a slot 1005-b. Although the transmission timeline 1000 is described with reference to a slot, the transmission timeline 1000 may be applicable to other time resources, for example, such as a symbol, a minislot, a subframe, or a frame. The set of PUSCH repetitions 1015 and the set of PUSCH repetition 1020 may, in some examples, be a cyclic repetition. That is, the set of PUSCH repetitions 1015 and the set of PUSCH repetitions 1020 may repeat in a cyclic pattern. For example, the set of PUSCH repetitions 1015 may include a PUSCH 1015-a and a PUSCH 1015-b, and the set of PUSCH repetitions 1020 may include a PUSCH 1020-a and a PUSCH 1020-b. In the example illustrated in FIG. 10, the PUSCH 1015 repetitions may interleave with the PUSCH repetitions 1020. For example, the PUSCH 1020-a may occur between the PUSCH 1015-a and the PUSCH 1015-b. Similarly, the PUSCH 1015-b may occur between the PUSCH 1020-a and the PUSCH 1020-b. Thus, repetition of PUSCH may be nonconsecutive over slots.

In the example illustrated in FIG. 10, the UE 115 may multiplex an aperiodic CSI report on one or both of the PUSCH 1015-b and the PUSCH 1020-b. In some examples, the UE 115 may multiplex the aperiodic CSI report on one or both of the PUSCH 1015-b and the PUSCH 1020-b based in part on the DCI message 1010. That is, the DCI message 1010 may activate (e.g., schedule) one or both of the PUSCH 1015-b and the PUSCH 1020-b for the UE 115 to multiplex the aperiodic CSI report on one or both of the PUSCH 1015-b and the PUSCH 1020-b. The PUSCH 1015-b and the PUSCH 1020-b may be a last two PUSCH repetitions associated with the slot 1005-b. In some other examples, the UE 115 may multiplex the aperiodic CSI report on one or both of the PUSCH 1015-a and the PUSCH 1020-a. The PUSCH 1015-a and the PUSCH 1020-a may be a first two PUSCH repetitions associated with the slot 1005-b. Accordingly, the UE 115 may multiplex the aperiodic CSI report on two or more consecutive PUSCH repetitions for a cyclic repetition, as illustrated in FIG. 10.

The transmission timeline 1000 may also include a PUCCH 1025 during a slot 1005-c. In some examples, the UE 115 may be configured to communicate UCI on the PUCCH 1025. In the example illustrated in FIG. 10, the UE 115 may be configured to multiplex the UCI on two or more PUSCH associated with one or both of the set of PUSCH repetitions 1015 and the set of PUSCH repetitions 1020 associated with the aperiodic CSI reporting. The UE 115 may determine that one or both of a repetition associated with the set of PUSCH repetitions 1015 and a repetition associated with the set of PUSCH repetitions 1020 satisfies a timing boundary 1030 (also referred to as a "timeline" or a "PUCCH timeline") associated with the PUCCH 1025.

The UE 115 may determine that one or both of a repetition (e.g., the PUSCH 1015-a or the PUSCH 1015-b) associated with the set of PUSCH repetitions 1015 and a repetition (e.g., the PUSCH 1020-*a* or the PUSCH 1020-*b*) associated with the set of PUSCH repetitions 1020 satisfies the timing boundary 1030 based in part on determining an overlap between the PUCCH 1025 and one or both of the repetition associated with the set of PUSCH repetitions 1015 and the repetition associated with the set of PUSCH repetitions 1020. The UE 115 may determine the overlap based in part on determining that a resource (e.g., one or more symbols) associated with the PUCCH 1025 overlaps with one or both of resources (e.g., one or more symbols) associated with the repetition (e.g., the PUSCH 1015-*a* or the PUSCH 1015-*b*) associated with the set of PUSCH repetitions 1015 and resources (e.g., one or more symbols) associated with the repetition (e.g., e.g., the PUSCH 1020-*a* or the PUSCH 1020-*b*) associated with the set of PUSCH repetitions 1020.

In the example illustrated in FIG. 10, the UE 115 may determine that the PUSCH 1015-*b* (e.g., a second PUSCH repetition associated with the set of PUSCH repetitions 1015) satisfies the timing boundary 1030 associated with the PUCCH 1025 and overlaps with the PUCCH 1025. Additionally or alternatively, the UE 115 may determine that the PUSCH 1020-*b* (e.g., a second PUSCH repetition associated with the set of PUSCH repetitions 1020) satisfies the timing boundary 1030 associated with the PUCCH 1025 and overlaps with the PUCCH 1025. The UE 115 may be configured to multiplex UCI with one or both of the PUSCH 1015-*b* (e.g., an aperiodic CSI PUSCH repetition) and the PUSCH 1020-*b* (e.g., an aperiodic CSI PUSCH repetition). Accordingly, the UE 115 may be configured to provide one or both of an aperiodic CSI report and a UCI on one or more last PUSCH repetitions for aperiodic CSI reporting during the slot 1005-*b*.

Alternatively, in some other examples, the UE 115 may determine that the PUSCH 1015-*a* (e.g., a first PUSCH repetition associated with the set of PUSCH repetitions 1015) satisfies the timing boundary 1030 associated with the PUCCH 1025 and overlaps with the PUCCH 1025. The UE 115 may also determine that the PUSCH 1020-*a* (e.g., a first PUSCH repetition associated with the set of PUSCH repetitions 1020) satisfies the timing boundary 1030 associated with the PUCCH 1025 and overlaps with the PUCCH 1025. The UE 115 may be configured to multiplex UCI with one or both of the PUSCH 1015-*a* (e.g., an aperiodic CSI PUSCH repetition) and the PUSCH 1020-*a* (e.g., an aperiodic CSI PUSCH repetition). Accordingly, the UE 115 may be configured to provide one or both of an aperiodic CSI report and a UCI on one or more first PUSCH repetitions for aperiodic CSI reporting during the slot 1005-*b*.

By multiplexing UCI with multiple PUSCH repetitions for aperiodic CSI reporting, the UE 115 may extend uplink coverage for UCI, among other examples. Additionally, the UE 115 experience improvements in uplink directional communications when operating in 5G systems. In some examples, the UE 115 may experience improvements to resource usage, coverage enhancement and, in some examples, may experience enhanced efficiency for uplink operations, among other benefits when multiplexing UCI on PUSCH repetitions for aperiodic CSI reporting and with disparate directional beams, among other examples.

Figure 11:
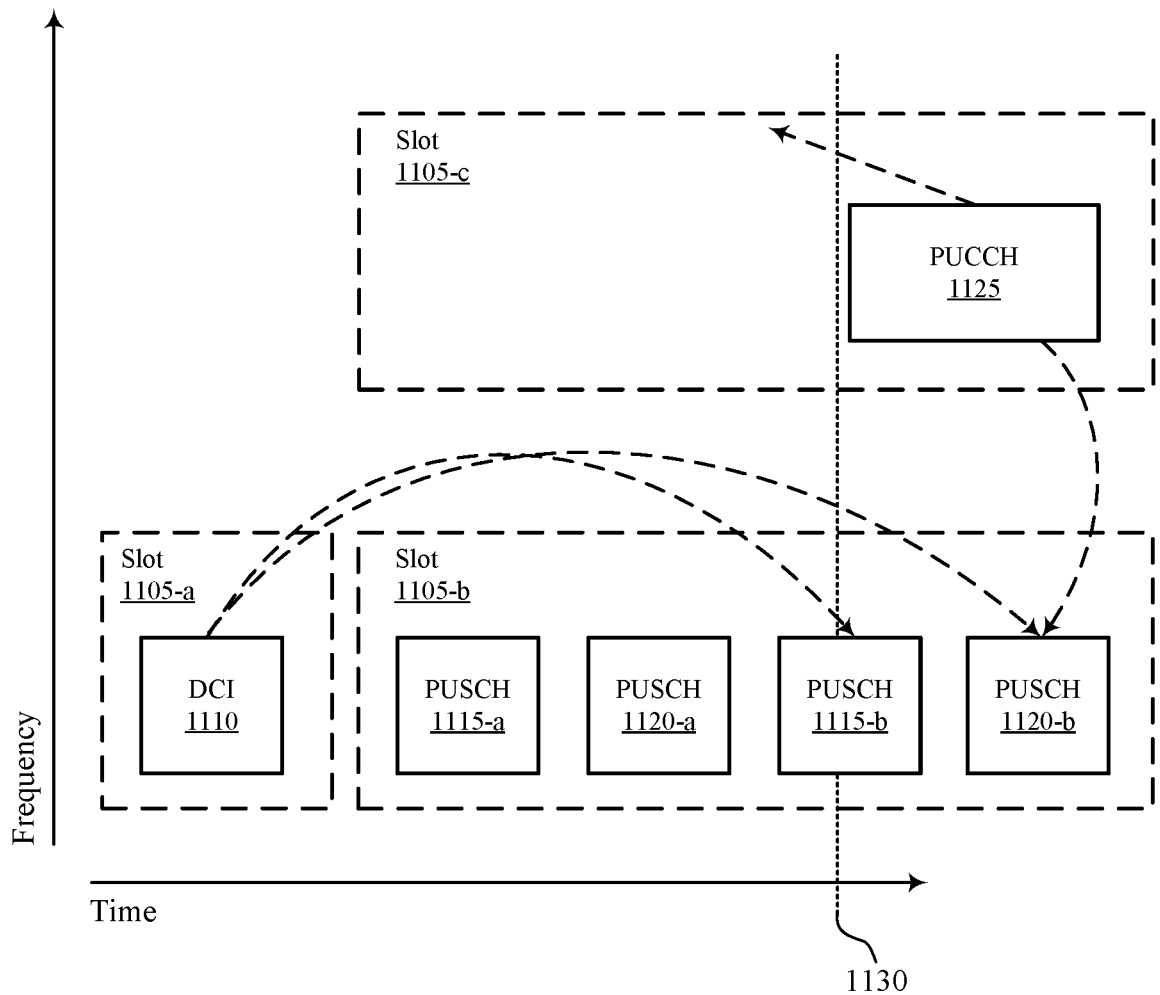

FIG. 11 illustrates an example of a transmission timeline 1100 in accordance with aspects of the present disclosure. The transmission timeline 1100 may implement aspects of the wireless communications systems 100 and 200 described with reference to FIGS. 1 and 2, respectively. For example, the transmission timeline 1100 may be based on a configuration by a base station 105, and implemented by a UE 115, which may be examples of the corresponding devices described with reference to FIGS. 1 and 2, respectively. In some examples, the transmission timeline 1100 may be applicable to implementations or instances when the UE 115 is configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming in 5G systems.

In the example illustrated in FIG. 11, the transmission timeline 1100 may be applicable to implementations or instances when the UE 115 is configured to support CSI operations, for example, such as providing CSI reports. In some examples, the UE 115 may support uplink data channel repetitions (e.g., PUSCH repetitions). For example, the transmission timeline 1100 may be applicable to implementations or instances when the UE 115 is configured to provide CSI reports on PUSCH repetitions to extend PUSCH coverage for the CSI reports. In some examples, the transmission timeline 1100 may be applicable to implementations or instances when the UE 115 is configured to provide CSI reports using multiple antenna panels. For example, the UE 115 may support beamforming operations, including beam sweeping operations to provide CSI reports over multiple directional beams using one or more antenna panels.

A CSI report may include one or more CSI parameters. In some examples, the UE 115 may generate the CSI report including the one more CSI parameters based on measuring one or more reference signals, such as SSB or a CSI-RS. For example, a base station 105 may transmit, and the UE 115 may receive, one or more SSBs or CSI-RS via directional communications between the base station 105 and the UE 115. The one or more CSI parameters may include one or more of a CQI, a PMI, or a CRI. In some other examples, the one or more CSI parameters may additionally or alternatively include one or more of a SSBRI, a LI, a RI, or a L1-RSRP.

The CSI report may be an aperiodic CSI report, and the UE 115 may transmit the aperiodic CSI report using a PUCCH or a DCI activated PUSCH. For example, the UE 115 may receive, during a slot 1105-*a*, a DCI message 1110 activating one or more PUSCH of a set of PUSCH repetitions 1115, 1120 for the aperiodic CSI report (e.g., scheduling the UE 115 to transmit or multiplex the aperiodic CSI report on the one or more PUSCH repetitions). Based in part on the DCI message 1110, the UE 115 may multiplex the aperiodic CSI report on the one or more PUSCH repetitions of the set of PUSCH repetitions 1115, 1120. The transmission timeline 1100 may also be applicable to implementations or instances when the UE 115 is configured to support a cyclic repetition of the set of PUSCH repetitions 1115, 1120. Although the transmission timeline 1100 is described with reference to a slot, the transmission timeline 1100 may be applicable to other time resources, for example, such as a symbol, a minislot, a subframe, or a frame.

The UE 115 may determine a set of PUSCH repetitions 1115 and a set of PUSCH repetitions 1120. In some examples, the set of PUSCH repetitions 1115 may correspond to a first PUSCH (e.g., a first uplink data channel), while the set of PUSCH repetitions 1120 may correspond to a second PUSCH (e.g., a second uplink data channel). The set of PUSCH repetitions 1115 may correspond to a first directional beam (e.g., a first mmW beam), while the set of PUSCH repetitions 1120 may correspond to a second directional beam (e.g., a second mmW beam) different from the first directional beam. The UE 115 may, in some examples, multiplex the aperiodic CSI report on the one or more PUSCH repetitions of the set of PUSCH repetitions 1115, 1120 with different directional beams. The first directional beam may have a corresponding SRI, a TCI, a TPMI, or an SRS set identifier, or any combination thereof. Similarly, the second directional beam may have a corresponding different: SRI, TCI, TPMI, or SRS set identifier, or any combination thereof. Additionally, the first directional beam may belong to a first antenna panel, while the second directional beam may belong to a second antenna panel different from the first antenna panel.

In some examples, the UE 115 may determine the set of PUSCH repetitions 1115 and the set of PUSCH repetitions 1120 for a slot 1105-b. Although the transmission timeline 1100 is described with reference to a slot, the transmission timeline 1100 may be applicable to other time resources, for example, such as a symbol, a minislot, a subframe, or a frame. The set of PUSCH repetitions 1115 and the set of PUSCH repetition 1120 may, in some examples, be a cyclic repetition. That is, the set of PUSCH repetitions 1115 and the set of PUSCH repetitions 1120 may repeat in a cyclic pattern. For example, the set of PUSCH repetitions 1115 may include a PUSCH 1115-a and a PUSCH 1115-b, and the set of PUSCH repetitions 1120 may include a PUSCH 1120-a and a PUSCH 1120-b. In the example illustrated in FIG. 11, the PUSCH 1115 repetitions may interleave with the PUSCH repetitions 1120. For example, the PUSCH 1120-a may occur between the PUSCH 1115-a and the PUSCH 1115-b. Similarly, the PUSCH 1115-b may occur between the PUSCH 1120-a and the PUSCH 1120-b. Thus, repetition of PUSCH associated with a same directional beam may be nonconsecutive over slots.

In the example illustrated in FIG. 11, the UE 115 may multiplex an aperiodic CSI report on one or both of the PUSCH 1115-b and the PUSCH 1120-b. In some examples, the UE 115 may multiplex the aperiodic CSI report on one or both of the PUSCH 1115-b and the PUSCH 1120-b based in part on the DCI message 1110. That is, the DCI message 1110 may activate (e.g., schedule) one or both of the PUSCH 1115-b and the PUSCH 1120-b for the UE 115 to multiplex the aperiodic CSI report on one or both of the PUSCH 1115-b and the PUSCH 1120-b. The PUSCH 1115-b and the PUSCH 1120-b may be a last two PUSCH repetitions associated with the slot 1105-b. In some other examples, the UE 115 may multiplex the aperiodic CSI report on one or both of the PUSCH 1115-a and the PUSCH 1120-a. The PUSCH 1115-a and the PUSCH 1120-a may be a first two PUSCH repetitions associated with the slot 1105-b. Accordingly, the UE 115 may multiplex the aperiodic CSI report on two or more consecutive PUSCH repetitions for a cyclic repetition, as illustrated in FIG. 11.

The transmission timeline 1100 may also include a PUCCH 1125 during a slot 1105-c. In some examples, the UE 115 may be configured to communicate UCI on the PUCCH 1125. In the example illustrated in FIG. 11, the UE 115 may be configured to multiplex the UCI on two or more PUSCH associated with one or both of the set of PUSCH repetitions 1115 and the set of PUSCH repetitions 1120 associated with the aperiodic CSI reporting. The UE 115 may determine that one or both of a repetition associated with the set of PUSCH repetitions 1115 and a repetition associated with the set of PUSCH repetitions 1120 satisfies a timing boundary 1130 (also referred to as a "timeline" or a "PUCCH timeline") associated with the PUCCH 1125.

The UE 115 may determine that one or both of a repetition (e.g., the PUSCH 1115-a or the PUSCH 1115-b) associated with the set of PUSCH repetitions 1115 and a repetition (e.g., the PUSCH 1120-a or the PUSCH 1120-b) associated with the set of PUSCH repetitions 1120 satisfies the timing boundary 1130 based in part on determining an overlap between the PUCCH 1125 and one or both of the repetition associated with the set of PUSCH repetitions 1115 and the repetition associated with the set of PUSCH repetitions 1120. The UE 115 may determine the overlap based in part on determining that a resource (e.g., one or more symbols) associated with the PUCCH 1125 overlaps with one or both of resources (e.g., one or more symbols) associated with the repetition (e.g., the PUSCH 1115-a or the PUSCH 1115-b) associated with the set of PUSCH repetitions 1115 and resources (e.g., one or more symbols) associated with the repetition (e.g., e.g., the PUSCH 1120-a or the PUSCH 1120-b) associated with the set of PUSCH repetitions 1120.

In the example illustrated in FIG. 11, the UE 115 may determine that the PUSCH 1115-b (e.g., a second PUSCH repetition associated with the set of PUSCH repetitions 1115) does not satisfy the timing boundary 1130 associated with the PUCCH 1125. The UE 115 may, however, determine that the PUSCH 1120-b (e.g., a second PUSCH repetition associated with the set of PUSCH repetitions 1120) satisfies the timing boundary 1130 associated with the PUCCH 1125 and overlaps with the PUCCH 1125. The UE 115 may be configured to multiplex UCI with the PUSCH 1120-b (e.g., an aperiodic CSI PUSCH repetition). Accordingly, the UE 115 may be configured to provide one or both of an aperiodic CSI report and a UCI on a last PUSCH repetition for aperiodic CSI reporting during the slot 1105-b.

By multiplexing UCI with multiple PUSCH repetitions for aperiodic CSI reporting, the UE 115 may extend uplink coverage for UCI, among other examples. Additionally, the UE 115 experience improvements in uplink directional communications when operating in 5G systems. In some examples, the UE 115 may experience improvements to resource usage, coverage enhancement and, in some examples, may experience enhanced efficiency for uplink operations, among other benefits when multiplexing UCI on PUSCH repetitions for aperiodic CSI reporting and with disparate directional beams, among other examples.

Figure 12:
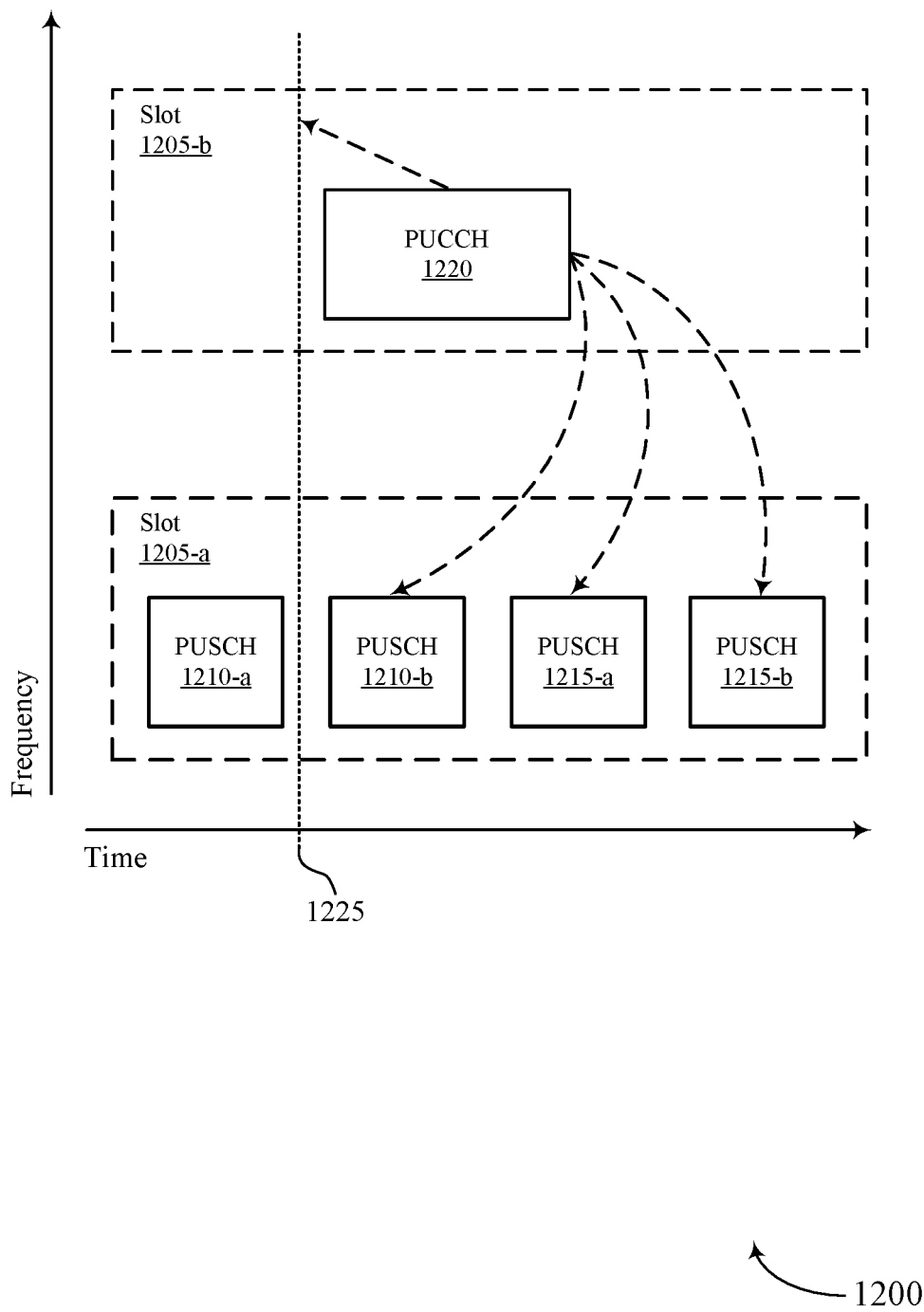

FIG. 12 illustrates an example of a transmission timeline 1200 in accordance with aspects of the present disclosure. The transmission timeline 1200 may implement aspects of the wireless communications systems 100 and 200 described with reference to FIGS. 1 and 2, respectively. For example, the transmission timeline 1200 may be based on a configuration by a base station 105, and implemented by a UE 115, which may be examples of the corresponding devices described with reference to FIGS. 1 and 2, respectively. In some examples, the transmission timeline 1200 may be applicable to implementations or instances when the UE 115 is configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming in 5G systems.

In the example illustrated in FIG. 12, the transmission timeline 1200 may be applicable to implementations or instances when the UE 115 is configured to support uplink communications using multiple antenna panels. The UE 115 may also support beamforming operations, including beam sweeping operations to provide uplink communications over multiple directional beams using one or more antenna panels. In some examples, the UE 115 may support uplink data channel repetitions (e.g., PUSCH repetitions), which may be a cyclic repetition or a sequential repetition. In the example illustrated in FIG. 12, the UE 115 may be configured to support a cyclic repetition of PUSCH repetitions 1210, 1215, which are scheduled by a same DCI message to transmit a same transport block or data repeatedly.

The UE 115 may determine a set of PUSCH repetitions 1210 and a set of PUSCH repetitions 1215. In some examples, the set of PUSCH repetitions 1210 may correspond to a first PUSCH, while the set of PUSCH repetitions 1215 may correspond to a second PUSCH. In some examples, the set of PUSCH repetitions 1210 may correspond to a first directional beam, while the set of PUSCH repetitions 1215 may correspond to a second directional beam different from the first directional beam. The first directional beam may be associated with a corresponding SRI, a TCI, a TPMI, or an SRS set identifier, or any combination thereof. Similarly, the second directional beam may be associated with a corresponding different: SRI, TCI, TPMI, or SRS set identifier, or any combination thereof. Additionally, the first directional beam may belong to a first antenna panel, while the second directional beam may belong to a second antenna panel different from the first antenna panel.

The UE 115 may determine the set of PUSCH repetitions 1210 and the set of PUSCH repetitions 1215 for a slot 1205-a. The set of PUSCH repetitions 1210 and the set of PUSCH repetition 1215 may be a sequential repetition. That is, set of PUSCH repetitions 1210 and the set of PUSCH repetition 1215 may repeat in a successive pattern. For example, the set of PUSCH repetitions 1210 may include a PUSCH 1210-a and a PUSCH 1210-b that may be consecutive in a time domain, and the set of PUSCH repetitions 1215 may include a PUSCH 1215-a and a PUSCH 1215-b that may also be consecutive in the time domain. Thus, repetition of PUSCH 1210, 1210 may be consecutive over slots. Although the transmission timeline 1200 is described with reference to a slot, the transmission timeline 1200 may be applicable to other time resources, for example, such as a symbol, a minislot, a subframe, or a frame.

The transmission timeline 1200 may also include a PUCCH 1220 during a slot 1205-b. In some examples, the UE 115 may be configured to communicate UCI on the PUCCH 1220. In the example illustrated in FIG. 12, the UE 115 may be configured to multiplex the UCI on two or more PUSCH associated with one or both of the set of PUSCH repetitions 1210 and the set of PUSCH repetitions 1215. The UE 115 may determine that one or both of a repetition associated with the set of PUSCH repetitions 1210 and a repetition associated with the set of PUSCH repetitions 1215 satisfies a timing boundary 1225 (also referred to as a "timeline" or a "PUCCH timeline") associated with the PUCCH 1220.

The UE 115 may determine that one or both of a repetition (e.g., the PUSCH 1210-a or the PUSCH 1210-b) associated with the set of PUSCH repetitions 1210 and a repetition (e.g., the PUSCH 1215-a or the PUSCH 1215-b) associated with the set of PUSCH repetitions 1215 satisfies a timing boundary 1225 based in part on determining an overlap between the PUCCH 1220 and one or both of the repetition associated with the set of PUSCH repetitions 1210 and the repetition associated with the set of PUSCH repetitions 1215. The UE 115 may determine the overlap based in part on determining that a resource (e.g., one or more symbols) associated with the PUCCH 1220 overlaps with one or both of resources (e.g., one or more symbols) associated with the repetition (e.g., the PUSCH 1210-a or the PUSCH 1210-b) associated with the set of PUSCH repetitions 1210 and resources (e.g., one or more symbols) associated with the repetition (e.g., e.g., the PUSCH 1215-a or the PUSCH 1215-b) associated with the set of PUSCH repetitions 1215. An overlap may be a full overlap or a partial overlap. A full overlap may include that all symbols of a PUSCH overlap with all symbols of a PUCCH, or all symbols of the PUSCH overlap with one or more symbols of the PUCCH, or one or more symbols of the PUSCH overlap with all symbols of the PUCCH. A partial overlap may include that one or more symbols of a PUSCH overlap with one or more symbols of a PUCCH.

In the example illustrated in FIG. 12, the UE 115 may determine that the PUSCH 1210-a (e.g., a first PUSCH repetition associated with the set of PUSCH repetitions 1210) does not satisfy the timing boundary 1225 associated with the PUCCH 1220, and does not overlap with the PUCCH 1220. For example, the UE 115 may determine that the PUSCH 1210-a does not satisfy the timing boundary 1225 associated with the PUCCH 1220 and does not overlap with the PUCCH 1220 based in part on a nonoverlap between the PUSCH 1210-a and the PUCCH 1220. That is, a nonoverlap between one or more symbols associated with the PUSCH 1210-a and one or more symbols of the PUCCH 1220. As a result, the UE 115 may refrain from multiplexing the UCI with the PUSCH 1210-a. A nonoverlap may be a full nonoverlap or a partial nonoverlap. A full nonoverlap may include that all symbols of a PUSCH are nonoverlapping with all symbols of a PUCCH, or all symbols of the PUSCH are nonoverlapping with one or more symbols of the PUCCH, or one or more symbols of the PUSCH are nonoverlapping with all symbols of the PUCCH. A partial nonoverlap may include that one or more symbols of a PUSCH are nonoverlapping with one or more symbols of a PUCCH.

The UE 115 may determine whether one or more remaining PUSCH of the set of PUSCH repetitions 1210 or whether a PUSCH of the set of PUSCH repetitions 1215 satisfies the timing boundary 1225. For example, the UE 115 may determine that the PUSCH 1210-b (e.g., a second PUSCH repetition associated with the set of PUSCH repetitions 1210) satisfies the timing boundary 1225 associated with the PUCCH 1220, and overlaps with the PUCCH 1220. The UE 115 may determine that one or more symbols associated with the PUSCH 1210-b overlap with one or more symbols of the PUCCH 1220, and thereby determine that the PUSCH 1210-b overlaps with the PUCCH 1220. Additionally or alternatively, the UE 115 may determine that the PUSCH 1215-b (e.g., a first PUSCH repetition associated with the set of PUSCH repetitions 1215) overlaps with the PUCCH 1220. For example, the UE 115 may determine that one or more symbols associated with the PUSCH 1215-a overlap with one or more symbols of the PUCCH 1220.

In some examples, the PUSCH 1215-a (e.g., the first PUSCH repetition associated with the set of PUSCH repetitions 1215) may or may not have to overlap with the PUCCH 1220 for the UE 115 to multiplex the UCI on the PUSCH 1210-b and the PUSCH 1215-a. Additionally, the PUSCH 1215-b (e.g., a second PUSCH repetition associated with the set of PUSCH repetitions 1215) may or may not have to overlap with the PUCCH 1220 for the UE 115 to multiplex the UCI on the PUSCH 1210-b, the PUSCH 1215-a, and the PUSCH 1215-b. The UE 115 may thus multiplex UCI associated with the PUCCH 1220 with the PUSCH 1210-b, the PUSCH 1215-a, and the PUSCH 1215-b, and transmit the multiplexed UCI on the PUSCH 1210-b, the PUSCH 1215-a, and the PUSCH 1215-b. The UE 115 may thus be configured to multiplex UCI on each PUSCH repetition from an earliest PUSCH repetition to a last PUSCH repetition of a slot which may satisfy the timing boundary 1225 for UCI multiplexing.

By multiplexing UCI with multiple PUSCH repetitions, the UE 115 may extend uplink coverage for UCI, among other examples. Additionally, the UE 115 experience improvements in uplink directional communications when operating in 5G systems. In some examples, the UE 115 may experience improvements to resource usage, coverage enhancement and, in some examples, may experience enhanced efficiency for uplink operations, among other benefits when multiplexing UCI on PUSCH with disparate directional beams, among other examples.

Figure 13:
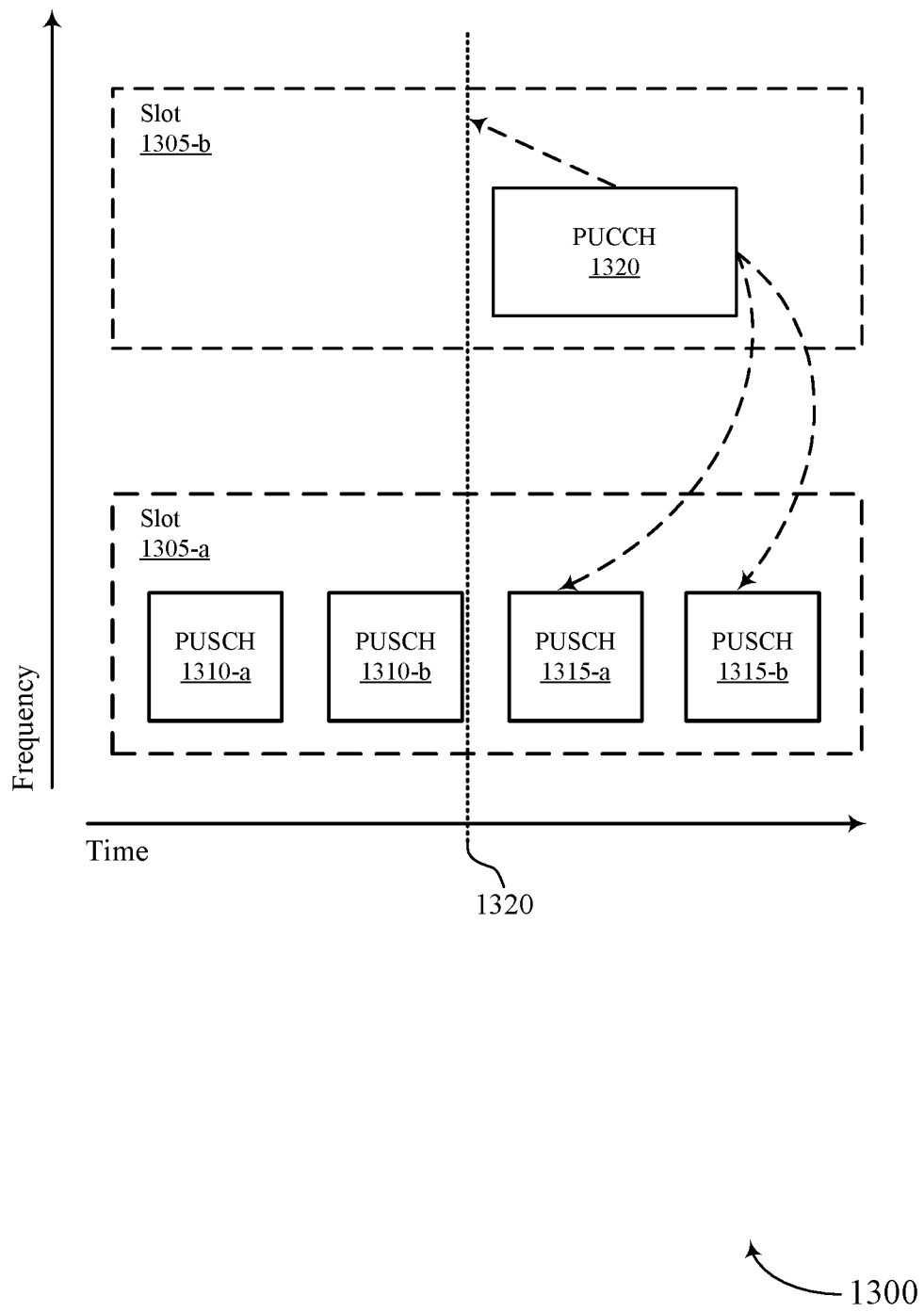

FIG. 13 illustrates an example of a transmission timeline 1300 in accordance with aspects of the present disclosure. The transmission timeline 1300 may implement aspects of the wireless communications systems 100 and 200 described with reference to FIGS. 1 and 2, respectively. For example, the transmission timeline 1300 may be based on a configuration by a base station 105, and implemented by a UE 115, which may be examples of the corresponding devices described with reference to FIGS. 1 and 2, respectively. In some examples, the transmission timeline 1300 may be applicable to implementations or instances when the UE 115 is configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming in 5G systems.

In the example illustrated in FIG. 13, the transmission timeline 1300 may be applicable to implementations or instances when the UE 115 is configured to support uplink communications using multiple antenna panels. The UE 115 may also support beamforming operations, including beam sweeping operations to provide uplink communications over multiple directional beams using one or more antenna panels. In some examples, the UE 115 may support uplink data channel repetitions (e.g., PUSCH repetitions), which may be a cyclic repetition or a sequential repetition. In the example illustrated in FIG. 13, the UE 115 may be configured to support a cyclic repetition of PUSCH repetitions 1310, 1315.

The UE 115 may determine a set of PUSCH repetitions 1310 and a set of PUSCH repetitions 1315. In some examples, the set of PUSCH repetitions 1310 may correspond to a first PUSCH, while the set of PUSCH repetitions 1315 may correspond to a second PUSCH. In some examples, the set of PUSCH repetitions 1310 may correspond to a first directional beam, while the set of PUSCH repetitions 1315 may correspond to a second directional beam different from the first directional beam. The first directional beam may be associated with a corresponding SRI, a TCI, a TPMI, or an SRS set identifier, or any combination thereof. Similarly, the second directional beam may be associated with a corresponding different: SRI, TCI, TPMI, or SRS set identifier, or any combination thereof. Additionally, the first directional beam may belong to a first antenna panel, while the second directional beam may belong to a second antenna panel different from the first antenna panel.

The UE 115 may determine the set of PUSCH repetitions 1310 and the set of PUSCH repetitions 1315 for a slot 1305-a. The set of PUSCH repetitions 1310 and the set of PUSCH repetition 1315 may be a sequential repetition. That is, set of PUSCH repetitions 1310 and the set of PUSCH repetition 1315 may repeat in a successive pattern. For example, the set of PUSCH repetitions 1310 may include a PUSCH 1310-a and a PUSCH 1310-b that may be consecutive in a time domain, and the set of PUSCH repetitions 1315 may include a PUSCH 1315-a and a PUSCH 1315-b that may also be consecutive in the time domain. Thus, repetition of PUSCH 1310, 1310 may be consecutive over slots. Although the transmission timeline 1300 is described with reference to a slot, the transmission timeline 1300 may be applicable to other time resources, for example, such as a symbol, a minislot, a subframe, or a frame.

The transmission timeline 1300 may also include a PUCCH 1320 during a slot 1305-b. In some examples, the UE 115 may be configured to communicate UCI on the PUCCH 1320. In the example illustrated in FIG. 13, the UE 115 may be configured to multiplex the UCI on two or more PUSCH associated with one or both of the set of PUSCH repetitions 1310 and the set of PUSCH repetitions 1315. The UE 115 may determine that one or both of a repetition associated with the set of PUSCH repetitions 1310 and a repetition associated with the set of PUSCH repetitions 1315 satisfies a timing boundary 1325 (also referred to as a "timeline" or a "PUCCH timeline") associated with the PUCCH 1320.

The UE 115 may determine that one or both of a repetition (e.g., the PUSCH 1310-a or the PUSCH 1310-b) associated with the set of PUSCH repetitions 1310 and a repetition (e.g., the PUSCH 1315-a or the PUSCH 1315-b) associated with the set of PUSCH repetitions 1315 satisfies a timing boundary 1325 based in part on determining an overlap between the PUCCH 1320 and one or both of the repetition associated with the set of PUSCH repetitions 1310 and the repetition associated with the set of PUSCH repetitions 1315. The UE 115 may determine the overlap based in part on determining that a resource (e.g., one or more symbols) associated with the PUCCH 1320 overlaps with one or both of resources (e.g., one or more symbols) associated with the repetition (e.g., the PUSCH 1310-a or the PUSCH 1310-b) associated with the set of PUSCH repetitions 1310 and resources (e.g., one or more symbols) associated with the repetition (e.g., e.g., the PUSCH 1315-a or the PUSCH 1315-b) associated with the set of PUSCH repetitions 1315.

In the example illustrated in FIG. 13, the UE 115 may determine that the PUSCH 1310-a and the PUSCH 1310-b (e.g., a first and a second PUSCH repetition associated with the set of PUSCH repetitions 1310) do not satisfy the timing boundary 1325 associated with the PUCCH 1320, and does not overlap with the PUCCH 1320. For example, the UE 115 may determine that the PUSCH 1310-a and the PUSCH 1310-b do not satisfy the timing boundary 1325 associated with the PUCCH 1320 and do not overlap with the PUCCH 1320 based in part on a nonoverlap between the PUCCH 1320 and one or both of the PUSCH 1310-a and the PUSCH 1310-b. In some examples, the UE 115 may drop the PUSCH 1310-a and the PUSCH 1310-b. For example, the UE 115 may refrain from multiplexing the UCI with the PUSCH 1310-a and the PUSCH 1310-b.

The UE 115 may determine whether a PUSCH of the set of PUSCH repetitions 1315 satisfies the timing boundary 1325. For example, the UE 115 may determine that the PUSCH 1315-a and the PUSCH 1315-b (e.g., a first and a second PUSCH repetition associated with the set of PUSCH repetitions 1315) satisfy the timing boundary 1325 associated with the PUCCH 1320. The UE 115 may thus multiplex UCI associated with the PUCCH 1320 with the PUSCH 1315-*a* and the PUSCH 1315-*b*, and transmit the multiplexed UCI on the PUSCH 1315-*a* and the PUSCH 1315-*b*. In some examples, the PUSCH 1315-*b* (e.g., the second PUSCH repetition associated with the set of PUSCH repetitions 1315) may or may not have to overlap with the PUCCH 1320 for the UE 115 to multiplex the UCI on the PUSCH 1315-*b*. The UE 115 may thus be configured to multiplex UCI on each PUSCH repetition from an earliest PUSCH repetition to a last PUSCH repetition of a slot which may satisfy the timing boundary 1325 for UCI multiplexing.

By multiplexing UCI with multiple PUSCH repetitions, the UE 115 may extend uplink coverage for UCI, among other examples. Additionally, the UE 115 experience improvements in uplink directional communications when operating in 5G systems. In some examples, the UE 115 may experience improvements to resource usage, coverage enhancement and, in some examples, may experience enhanced efficiency for uplink operations, among other benefits when multiplexing UCI on PUSCH with disparate directional beams, among other examples.

Returning to FIG. 2, in some examples, the UE 115-*a* may be configured to determine whether to multiplex UCI on different PUSCH repetitions with disparate directional beams based in part on one or more factors. For example, the UE 115-*a* may be configured to determine a UCI type, and determine to multiplex the UCI on different PUSCH repetitions with disparate directional beams based in part on the UCI type of the UCI. In some examples, if a feedback message (e.g., hybrid automatic repeat request (HARQ) acknowledgment (HARQ-Ack)) is included in the UCI, the UE 115-*a* may be configured to repeat the UCI as described herein. Alternatively, if there is no feedback message (e.g., HARQ-Ack) included in the UCI, the UE 115-*a* multiplex the UCI on an earliest PUSCH repetition in a slot.

The UE 115-*a* may, in some other examples, be configured to determine a UCI payload size when determining whether to multiplex UCI on different PUSCH repetitions with disparate directional beams. In some examples, if a UCI payload size is equal to or lesser than a threshold (e.g., a threshold number of payload bits), the UE 115-*a* may be configured to multiplex the UCI on multiple PUSCH repetitions satisfying the timing boundary for UCI multiplexing. The threshold can be RRC configured or predetermined by a default value. Otherwise, the UE 115-*a* may multiplex the UCI on a single PUSCH repetitions. In some examples, the UE 115-*a* may determine a number of PUSCH repetitions to multiplex the UCI on based in part on the UCI payload size. The UE 115-*a* may, in other examples, be configured to determine a number of resources (e.g., resource elements) for transmitting the UCI when multiplexing on each PUSCH repetition of a set of PUSCH repetitions with disparate directional beams. In some examples, the UE 115-*a* may determine the number of resources for transmitting the UCI based in part on a duration of a PUSCH repetition indicated in a message (e.g., a DCI or RRC message). For example, a DCI or RRC message may include a length indication (e.g., L) that may indicate a time duration of a PUSCH repetition.

The wireless communications system 200 may thus be implemented to realize one or more of the following potential improvements, among others. The techniques employed by the UE 115-*a* may provide benefits and enhancements to the operation of the UE 115-*a*. For example, operations performed by the UE 115-*a* may provide improvements to uplink directional communications when operating in 5G systems. In some examples, configuring the UE 115-*a* to support multiplexing physical uplink channels carrying uplink directional communications using different directional beams, among other examples in 5G systems, may support improvements to resource usage, coverage enhancement and, in some examples, may promote enhanced efficiency for uplink operations, among other benefits.

Figure 14:
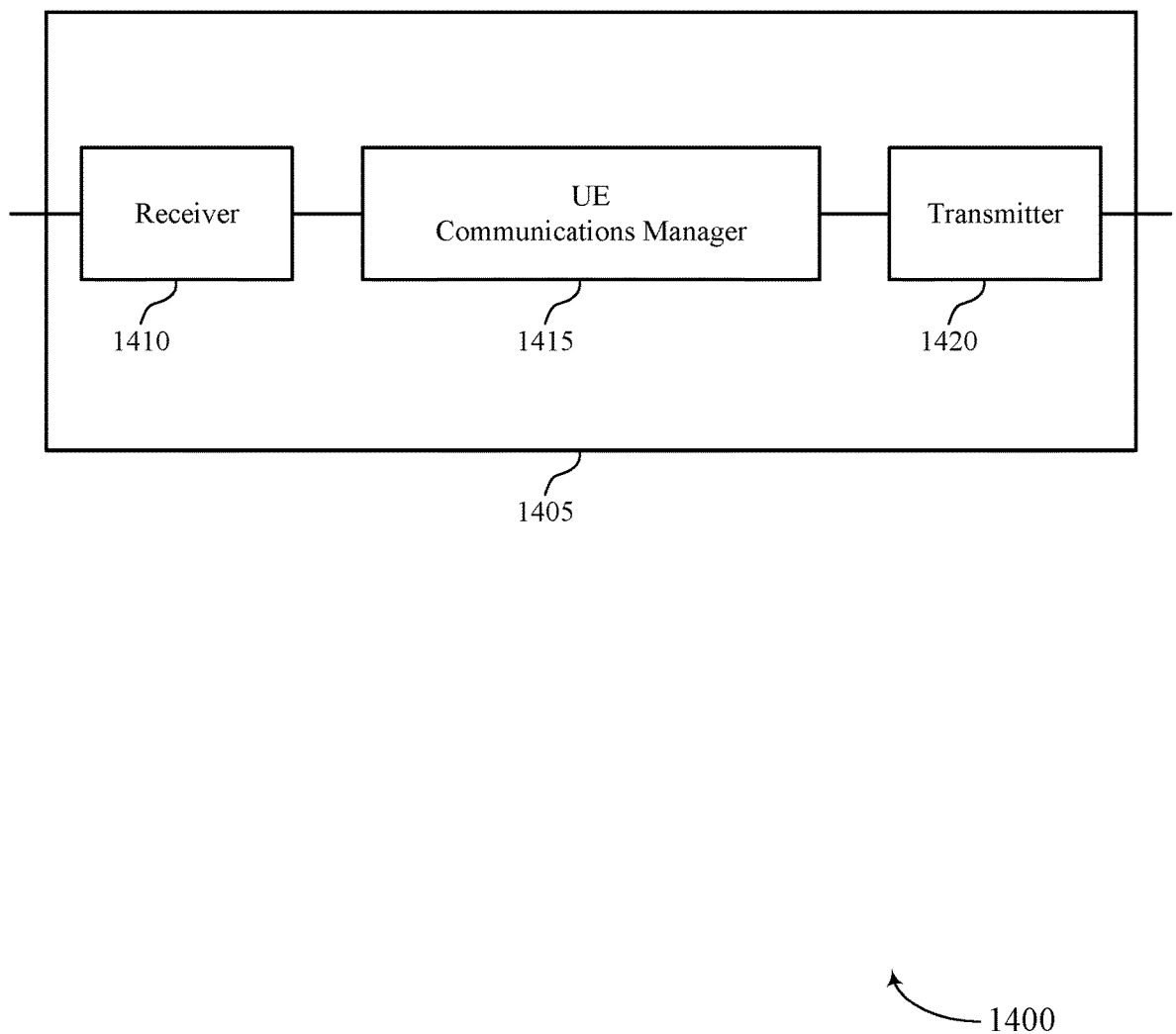
FIGS. 14 and 15 show diagrams of devices in accordance with aspects of the present disclosure.

FIG. 14 shows a diagram 1400 of a device 1405 in accordance with aspects of the present disclosure. The device 1405 may be an example of aspects of a UE 115 as described herein. The device 1405 may include a receiver 1410, a UE communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to multiplexing for physical uplink channels with different directional beams, etc.). Information may be passed on to other components of the device 1405. The receiver 1410 may be an example of aspects of the transceiver 1720 described with reference to FIG. 17. The receiver 1410 may utilize a single antenna or a set of antennas.

The UE communications manager 1415 may determine a set of repetitions of a first uplink data channel associated with a first directional beam and a set of repetitions of a second uplink data channel associated with a second directional beam different from the first directional beam, multiplex an uplink transmission associated with an uplink control channel with one or both of the first uplink data channel and the second uplink data channel, based on the set of repetitions of the first uplink data channel and the set of repetitions of the second uplink data channel, and transmit the multiplexed uplink transmission on one or both of the first uplink data channel and the second uplink data channel. The UE communications manager 1415 may be an example of aspects of the UE communications manager 1710 described herein.

The UE communications manager 1415, or its sub-components, may be implemented in hardware, code (e.g., software or firmware) executed by a processor, or any combination thereof. If implemented in code executed by a processor, the functions of the UE communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 1415, or its sub-components, may be physically located at various positions, including being distributed such that portions of functions are implemented at different physical locations by one or more physical components. In some examples, the UE communications manager 1415, or its sub-components, may be a separate and distinct component in accordance with various aspects of the present disclosure. In some examples, the UE communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
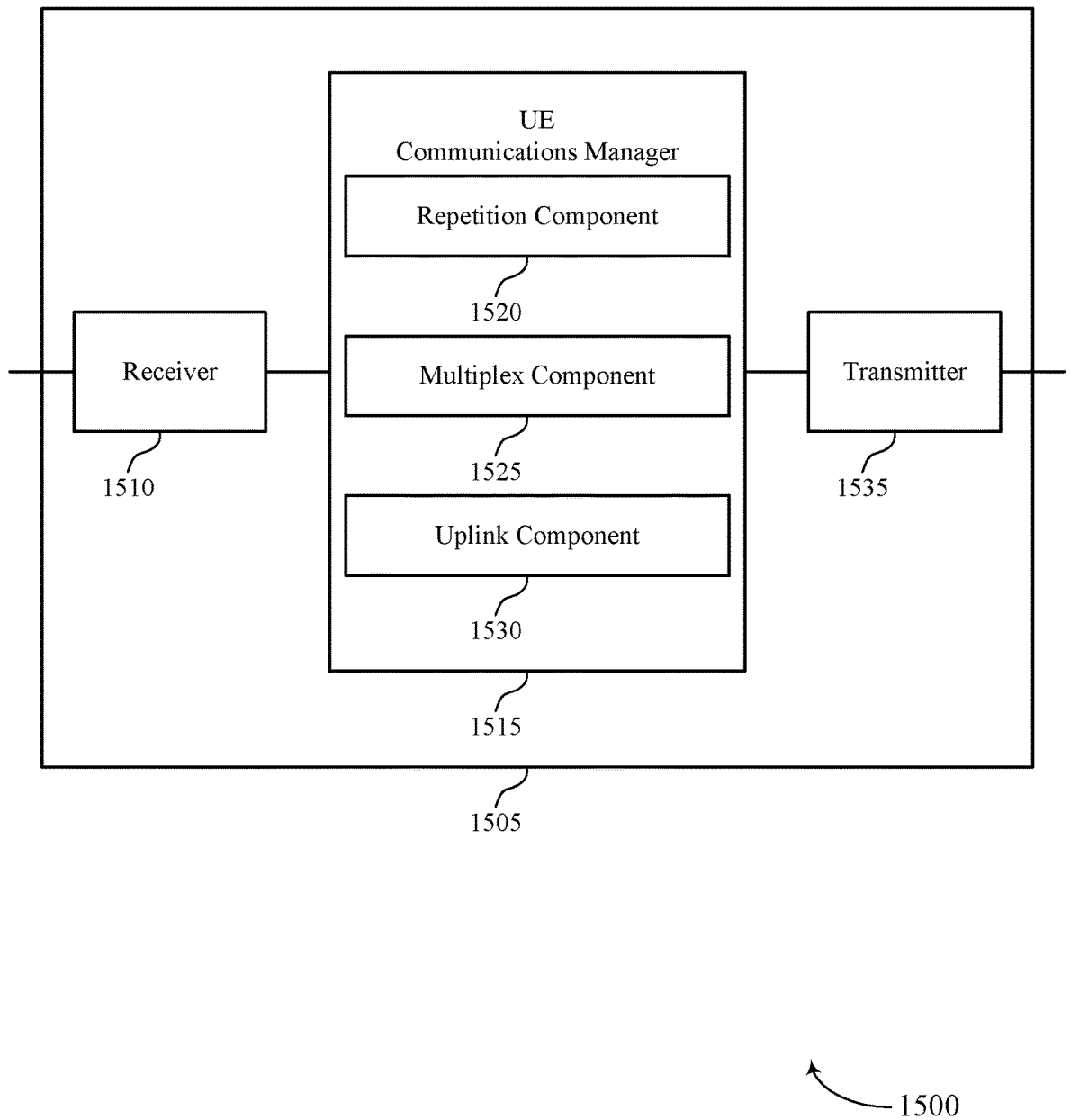

FIG. 15 shows a diagram 1500 of a device 1505 in accordance with aspects of the present disclosure. The device 1505 may be an example of aspects of a device 1405, or a UE 115 as described herein. The device 1505 may include a receiver 1510, a UE communications manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to multiplexing for physical uplink channels with different directional beams, etc.). Information may be passed on to other components of the device 1505. The receiver 1510 may be an example of aspects of the transceiver 1720 described with reference to FIG. 17. The receiver 1510 may utilize a single antenna or a set of antennas.

The UE communications manager 1515 may be an example of aspects of the UE communications manager 1415 as described herein. The UE communications manager 1515 may include a repetition component 1520, a multiplex component 1525, and an uplink component 1530. The UE communications manager 1515 may be an example of aspects of the UE communications manager 1710 described herein.

The repetition component 1520 may determine a set of repetitions of a first uplink data channel associated with a first directional beam and a set of repetitions of a second uplink data channel associated with a second directional beam different from the first directional beam. The multiplex component 1525 may multiplex an uplink transmission associated with an uplink control channel with one or both of the first uplink data channel and the second uplink data channel, based on the set of repetitions of the first uplink data channel and the set of repetitions of the second uplink data channel. The uplink component 1530 may transmit the multiplexed uplink transmission on one or both of the first uplink data channel and the second uplink data channel.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
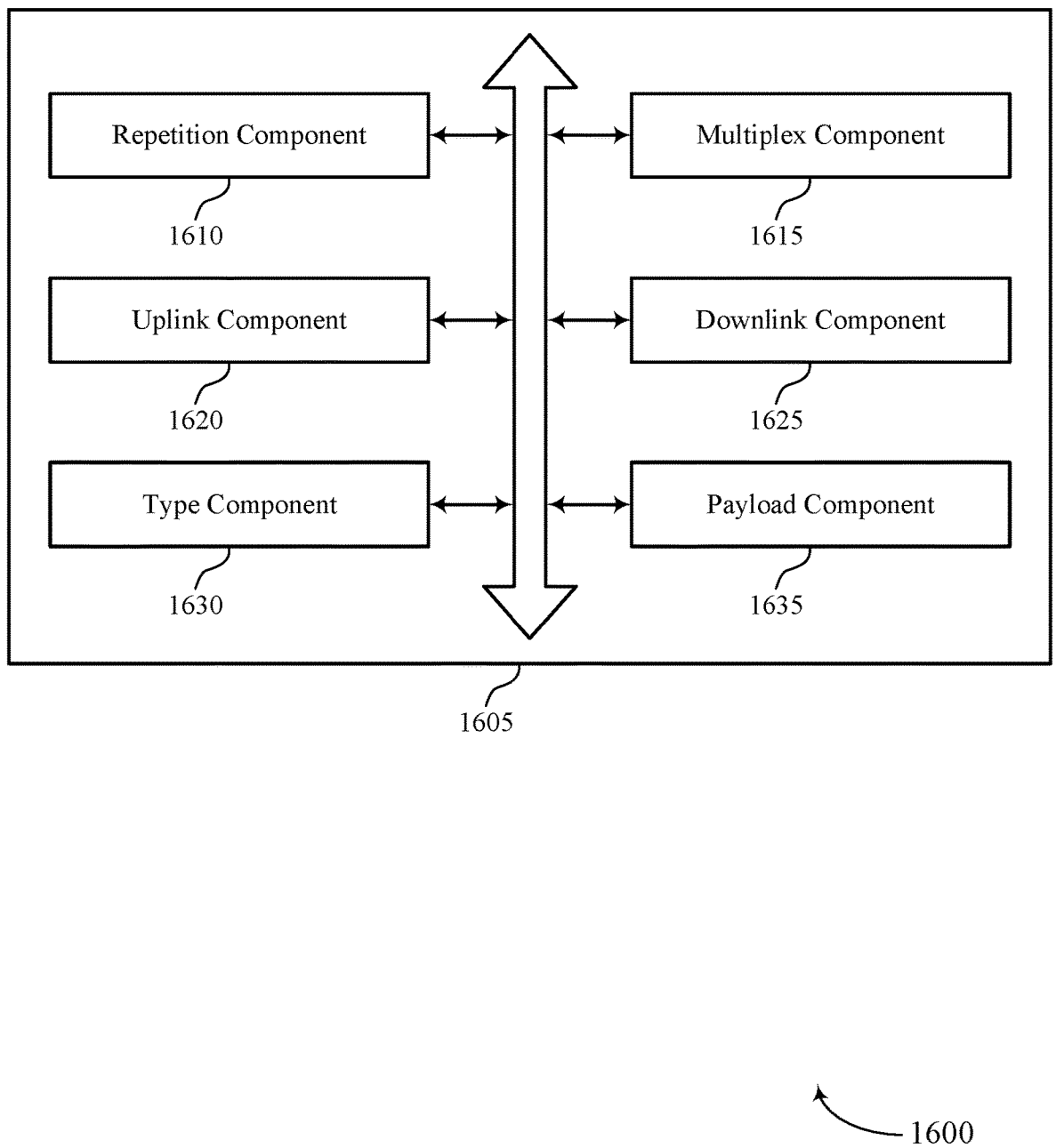
FIG. 16 shows a diagram of a UE communications manager in accordance with aspects of the present disclosure.

FIG. 16 shows a diagram 1600 of a UE communications manager 1605 in accordance with aspects of the present disclosure. The UE communications manager 1605 may be an example of aspects of a UE communications manager 1415, a UE communications manager 1515, or a UE communications manager 1710 described herein. The UE communications manager 1605 may include a repetition component 1610, a multiplex component 1615, an uplink component 1620, a downlink component 1625, a type component 1630, and a payload component 1635. Each of these modules may communicate, directly or indirectly, with one another (e.g., via one or more buses).

The repetition component 1610 may determine a set of repetitions of a first uplink data channel associated with a first directional beam and a set of repetitions of a second uplink data channel associated with a second directional beam different from the first directional beam. In some examples, the repetition component 1610 may determine that one or both of a repetition associated with the set of repetitions of the first uplink data channel and a repetition associated with the set of repetitions of the second uplink data channel satisfies a timing boundary associated with the uplink control channel. In some examples, the repetition component 1610 may determine an overlap between the uplink control channel and one or both of the repetition associated with the set of repetitions of the first uplink data channel and the repetition associated with the set of repetitions of the second uplink data channel. In some examples, the repetition component 1610 may determine that a resource associated with the uplink control channel overlaps with one or both of a resource associated with the repetition of the first uplink data channel and a resource associated with the repetition of the second uplink data channel.

In some examples, the repetition component 1610 may determine an overlap between the uplink control channel and one or both of a first repetition associated with the set of repetitions of the first uplink data channel and a first repetition associated with the set of repetitions of the second uplink data channel. In some examples, the repetition component 1610 may determine an overlap between the uplink control channel and one or both of a second repetition associated with the set of repetitions of the first uplink data channel and a second repetition associated with the set of repetitions of the second uplink data channel. In some examples, the repetition component 1610 may determine an overlap between the uplink control channel and a first repetition associated with the set of repetitions of the second uplink data channel.

In some examples, the repetition component 1610 may determine a nonoverlap between the uplink control channel and a first repetition associated with the set of repetitions of the first uplink data channel. In some examples, the repetition component 1610 may determine a nonoverlap between the uplink control channel and a second repetition associated with the set of repetitions of the first uplink data channel. In some examples, the repetition component 1610 may determine an overlap between the uplink control channel and a second repetition associated with the set of repetitions of the second uplink data channel. In some examples, the repetition component 1610 may determine an overlap between the uplink control channel and one or both of the second repetition of the first uplink data channel and the second repetition of the second uplink data channel. In some examples, the repetition component 1610 may determine an overlap between the uplink control channel and the second repetition of the second uplink data channel. In some examples, the repetition component 1610 may determine one or both of a subset of repetitions associated with the set of repetitions of the first uplink data channel and a subset of repetitions associated with the set of repetitions of the second uplink data channel that satisfy a timing boundary associated with the uplink control channel.

In some cases, the first repetition of the second uplink data channel occurs before the second repetition of the first uplink data channel. In some cases, the second repetition of the first uplink data channel and the second repetition of the second uplink data channel are consecutive. In some cases, the second repetition of the first uplink data channel and the second repetition of the second uplink data channel are nonconsecutive. In some cases, one or both of the subset of repetitions associated with the first uplink data channel and the subset of repetitions associated with the second uplink data channel are associated with a same slot.

In some cases, a repetition associated with the set of repetitions of the first uplink data channel and a repetition associated with the set of repetitions of the second uplink data channel are consecutive. In some cases, a repetition associated with the set of repetitions of the first uplink data channel and a repetition associated with the set of repetitions of the second uplink data channel are nonconsecutive. In some cases, the first uplink data channel and the second uplink data channel include a PUSCH. In some cases, the set of repetitions associated with the first uplink data channel and the set of repetitions associated with the second uplink data channel include a cyclic repetition. In some cases, the set of repetitions associated with the first uplink data channel and the set of repetitions associated with the second uplink data channel include a sequential repetition.

The multiplex component 1615 may multiplex an uplink transmission associated with an uplink control channel with one or both of the first uplink data channel and the second uplink data channel, based on the set of repetitions of the first uplink data channel and the set of repetitions of the second uplink data channel. In some examples, the multiplex component 1615 may multiplex the uplink transmission with one or both of the first uplink data channel and the second uplink data channel based on one or both of the repetition of the first uplink data channel and the repetition of the second uplink data channel satisfying the timing boundary associated with the uplink control channel. In some examples, the multiplex component 1615 may multiplex the uplink transmission with the repetition of the first uplink data channel and the repetition of the second uplink data channel based on the overlap between the uplink control channel and one or both of the repetition of the first uplink data channel or the repetition of the second uplink data channel.

In some examples, the multiplex component 1615 may multiplex the uplink transmission with the first repetition of the first uplink data channel and the first repetition of the second uplink data channel based on the overlap between the uplink control channel and one or both of the first repetition of the first uplink data channel or the first repetition of the second uplink data channel. In some examples, the multiplex component 1615 may multiplex the uplink transmission with the second repetition of the first uplink data channel and the second repetition of the second uplink data channel based on the overlap between the uplink control channel and one or both of the second repetition of the first uplink data channel or the second repetition of the second uplink data channel. In some examples, the multiplex component 1615 may multiplex the uplink transmission with the first repetition of the second uplink data channel and a second repetition associated with the set of repetitions of the first uplink data channel based on the overlap between the uplink control channel and the first repetition of the second uplink data channel.

In some examples, the multiplex component 1615 may refrain from multiplexing the uplink transmission with the first repetition of the first uplink data channel based on the nonoverlap. In some examples, refraining from multiplexing the uplink transmission with the first repetition of the first uplink data channel includes dropping the first uplink data channel. In some examples, the multiplex component 1615 may multiplex the uplink transmission with the second repetition of the second uplink data channel based on the overlap between the uplink control channel and the second repetition of the second uplink data channel. In some examples, the multiplex component 1615 may refrain from multiplexing the uplink transmission with the second repetition of the second uplink data channel based on the second repetition of the second uplink data channel corresponding to an ending of a slot. In some examples, the multiplex component 1615 may refrain from multiplexing the uplink transmission with the second repetition of the second uplink data channel includes dropping the second uplink data channel.

In some examples, the multiplex component 1615 may multiplex the second uplink transmission on a second repetition associated with the set of repetitions of the first uplink data channel and a second repetition associated with the set of repetitions of the second uplink data channel based on the indication in the received downlink control information message. In some examples, the multiplex component 1615 may multiplex the uplink transmission with one or both of the subset of repetitions associated with the first uplink data channel and the subset of repetitions associated with the second uplink data channel based on satisfying the timing boundary. In some examples, the multiplex component 1615 may multiplex the uplink transmission includes multiplexing the uplink transmission with an earliest repetition associated with the first uplink data channel or the second uplink data channel to a latest repetition associated with the first uplink data channel or the second uplink data channel.

In some cases, the multiplex component 1615 may refrain from multiplexing the uplink transmission with the second repetition of the first uplink data channel, where multiplexing the uplink transmission includes multiplexing the uplink transmission with the second repetition of the second uplink data channel based on the overlap between the uplink control channel and the second repetition of the second uplink data channel, the second repetition of the second uplink data channel corresponding to an ending of the second slot. In some cases, the uplink control channel includes a PUCCH. In some cases, the uplink transmission includes UCI. In some cases, the uplink transmission includes an aperiodic CSI.

The uplink component 1620 may transmit the multiplexed uplink transmission on one or both of the first uplink data channel and the second uplink data channel. In some examples, the uplink component 1620 may transmit the uplink transmission on the uplink control channel based on the refraining. In some cases, the uplink transmission includes an aperiodic CSI. The downlink component 1625 may receive, during a first slot, a downlink control information message including an indication to multiplex one or both of a second uplink transmission with the first uplink data channel and the second uplink data channel during a second slot. In some examples, the downlink component 1625 may receive a downlink control information message including an indication of a duration of each repetition associated with the set of repetitions of the first uplink data channel and a duration of each repetition associated with the number repetitions of the second uplink data channel. In some examples, the downlink component 1625 may determine resources to use for the uplink transmission when multiplexing the uplink transmission with one or both of the first uplink data channel and the second uplink data channel based on the indication received in the downlink control information message.

The type component 1630 may determine a type of the uplink transmission, where multiplexing the uplink transmission with one or both of the first uplink data channel and the second uplink data channel is based on the type of the uplink transmission. In some cases, the uplink transmission includes UCI and the type includes an UCI type. The payload component 1635 may determine a payload size of the uplink transmission, where multiplexing the uplink transmission with one or both of the first uplink data channel and the second uplink data channel is based on the payload size of the uplink transmission. In some cases, the uplink transmission includes UCI and the payload size includes an UCI payload size.

Figure 17:
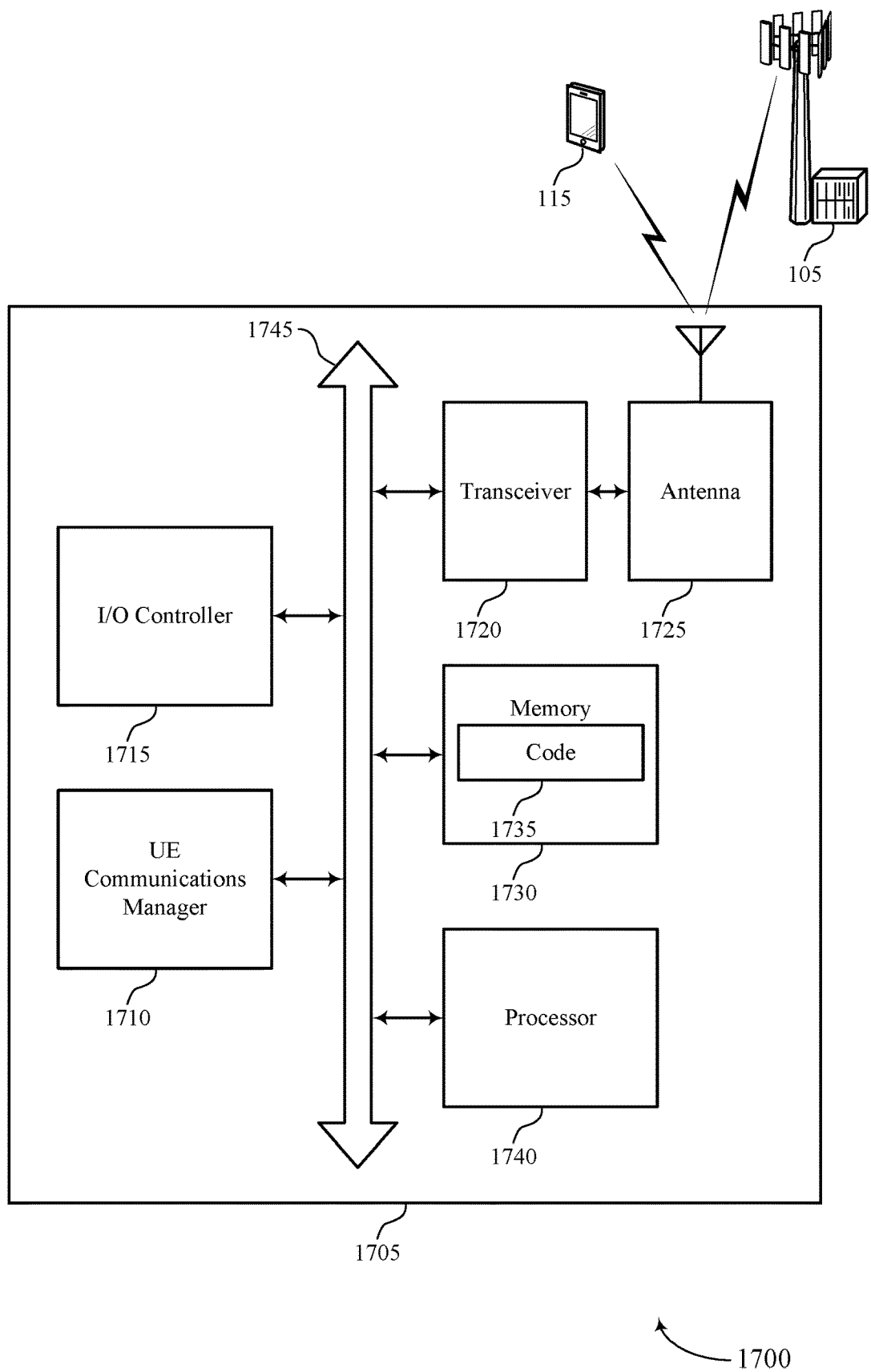
FIG. 17 shows a diagram of a system including a device in accordance with aspects of the present disclosure.

FIG. 17 shows a diagram of a system 1700 including a device 1705 in accordance with aspects of the present disclosure. The device 1705 may be an example of or include the components of device 1405, device 1505, or a UE 115 as described herein. The device 1705 may include components for bi-directional voice and data communications including components for transmitting and receiving communications, including a UE communications manager 1710, an I/O controller 1715, a transceiver 1720, an antenna 1725, memory 1730, and a processor 1740. These components may be in electronic communication via one or more buses (e.g., bus 1745).

The device 1705 may as described herein be implemented to realize one or more potential improvements. One implementation may allow the device 1705 to save power and increase battery life by communicating with a base station 105 (as shown in FIG. 2) more efficiently. For example, the device 1705 may extend a coverage of a PUSCH for UCI and aperiodic CSI reports. In addition, the device 1705 may experience reduced complexity, better throughput through multiplexing UCI on PUSCH repetitions. Another implementation may promote higher reliability and lower latency communications at the device 1705 due to UCI reporting flexibility of the device 1705, as a result of supporting PUSCH repetitions.

The UE communications manager 1710 may determine a set of repetitions of a first uplink data channel associated with a first directional beam and a set of repetitions of a second uplink data channel associated with a second directional beam different from the first directional beam, multiplex an uplink transmission associated with an uplink control channel with one or both of the first uplink data channel and the second uplink data channel, based on the set of repetitions of the first uplink data channel and the set of repetitions of the second uplink data channel, and transmit the multiplexed uplink transmission on one or both of the first uplink data channel and the second uplink data channel.

The I/O controller 1715 may manage input and output signals for the device 1705. The I/O controller 1715 may also manage peripherals not integrated into the device 1705. In some cases, the I/O controller 1715 may represent a physical connection or port to an external peripheral. In some cases, the I/O controller 1715 may utilize an operating system such as iOS®, ANDROID®, MS-DOS®, MS-WINDOWS®, OS/2®, UNIX®, LINUX®, or another known operating system. In other cases, the I/O controller 1715 may represent or interact with a modem, a keyboard, a mouse, a touchscreen, or a similar device. In some cases, the I/O controller 1715 may be implemented as part of a processor. In some cases, a user may interact with the device 1705 via the I/O controller 1715 or via hardware components controlled by the I/O controller 1715.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas. In some examples, the device 1705 may include a single antenna 1725. However, in some examples, the device 1705 may have more than one antenna 1725, which may be capable of concurrently transmitting or receiving multiple wireless transmissions.

The memory 1730 may include RAM and ROM. The memory 1730 may store computer-readable, computer-executable code 1735 including instructions that, when executed, cause the processor to perform various functions described herein. In some cases, the memory 1730 may contain, among other things, a BIOS which may control basic hardware or software operation such as the interaction with peripheral components or devices.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting multiplexing for physical uplink channels with different directional beams).

Figure 18:
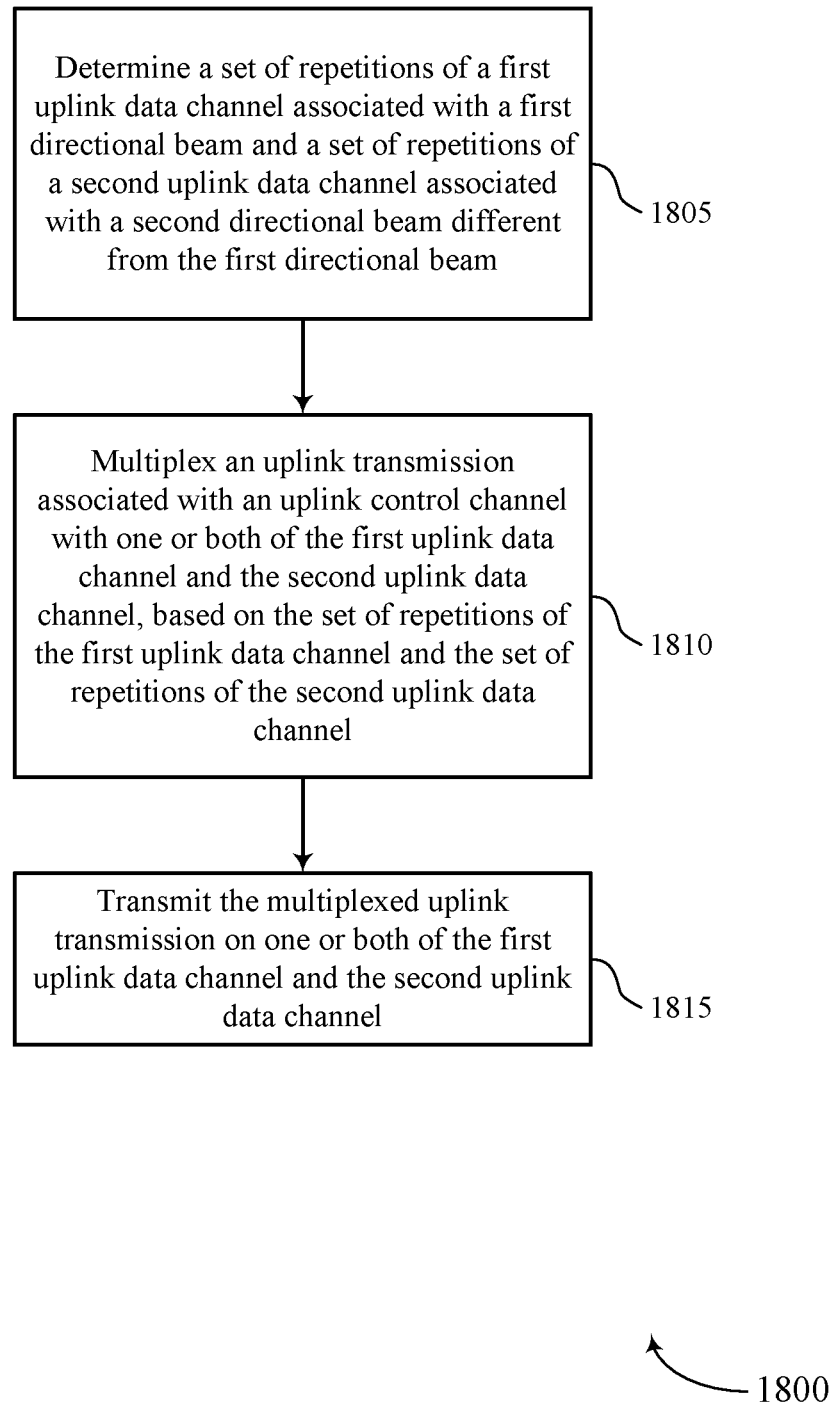
FIGS. 18 and 19 show flowcharts illustrating methods in accordance with aspects of the present disclosure.

FIG. 18 shows a flowchart illustrating a method 1800 in accordance with aspects of the present disclosure. The operations of method 1800 may be implemented by a UE 115 or its components as described herein. For example, the operations of method 1800 may be performed by a UE communications manager as described with reference to FIGS. 14 through 17. In some examples, a UE may execute a set of instructions to control the functional elements of the UE to perform the functions described below. Additionally or alternatively, a UE may perform aspects of the functions described below using special-purpose hardware.

At 1805, the UE may determine a set of repetitions of a first uplink data channel associated with a first directional beam and a set of repetitions of a second uplink data channel associated with a second directional beam different from the first directional beam. The operations of 1805 may be performed according to the methods described herein. In some examples, aspects of the operations of 1805 may be performed by a repetition component as described with reference to FIGS. 14 through 17.

At 1810, the UE may multiplex an uplink transmission associated with an uplink control channel with one or both of the first uplink data channel and the second uplink data channel, based on the set of repetitions of the first uplink data channel and the set of repetitions of the second uplink data channel. The operations of 1810 may be performed according to the methods described herein. In some examples, aspects of the operations of 1810 may be performed by a multiplex component as described with reference to FIGS. 14 through 17.

At 1815, the UE may transmit the multiplexed uplink transmission on one or both of the first uplink data channel and the second uplink data channel. The operations of 1815 may be performed according to the methods described herein. In some examples, aspects of the operations of 1815 may be performed by an uplink component as described with reference to FIGS. 14 through 17.

Figure 19:
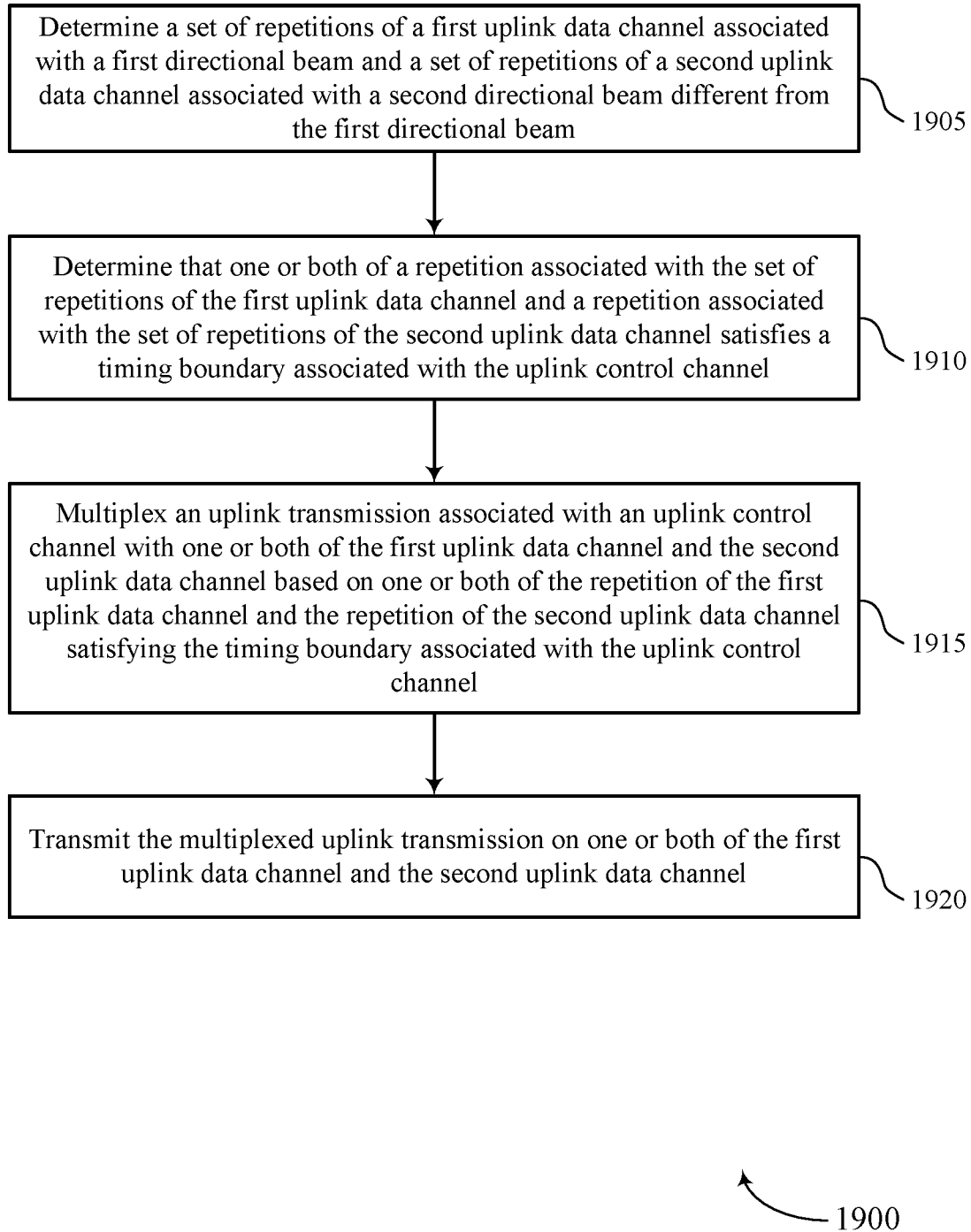

FIG. 19 shows a flowchart illustrating a method 1900 in accordance with aspects of the present disclosure. The operations of method 1900 may be implemented by a UE 115 or its components as described herein. For example, the operations of method 1900 may be performed by a UE communications manager as described with reference to FIGS. 14 through 17. In some examples, a UE may execute a set of instructions to control the functional elements of the UE to perform the functions described below. Additionally or alternatively, a UE may perform aspects of the functions described below using special-purpose hardware.

At 1905, the UE may determine a set of repetitions of a first uplink data channel associated with a first directional beam and a set of repetitions of a second uplink data channel associated with a second directional beam different from the first directional beam. The operations of 1905 may be performed according to the methods described herein. In some examples, aspects of the operations of 1905 may be performed by a repetition component as described with reference to FIGS. 14 through 17.

At 1910, the UE may determine that one or both of a repetition associated with the set of repetitions of the first uplink data channel and a repetition associated with the set of repetitions of the second uplink data channel satisfies a timing boundary associated with the uplink control channel. The operations of 1910 may be performed according to the methods described herein. In some examples, aspects of the operations of 1910 may be performed by a repetition component as described with reference to FIGS. 14 through 17.

At 1915, the UE may multiplex an uplink transmission associated with an uplink control channel with one or both of the first uplink data channel and the second uplink data channel based on one or both of the repetition of the first uplink data channel and the repetition of the second uplink data channel satisfying the timing boundary associated with the uplink control channel. The operations of 1915 may be performed according to the methods described herein. In some examples, aspects of the operations of 1915 may be performed by a multiplex component as described with reference to FIGS. 14 through 17.

At 1920, the UE may transmit the multiplexed uplink transmission on one or both of the first uplink data channel and the second uplink data channel. The operations of 1920 may be performed according to the methods described herein. In some examples, aspects of the operations of 1920 may be performed by an uplink component as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A wireless communication device for wireless communications, comprising:
    one or more memories storing processor-executable code; and
    one or more processors coupled with the one or more memories and operable to execute the code to cause the wireless communication device to:
        determine a set of repetitions of a first uplink data channel associated with a first directional beam and a set of repetitions of a second uplink data channel associated with a second directional beam different from the first directional beam;
        multiplex uplink control information associated with an uplink control channel on both of a repetition of the set of repetitions of the first uplink data channel and a repetition of the set of repetitions of the second uplink data channel, based at least in part on the set of repetitions of the first uplink data channel and the set of repetitions of the second uplink data channel; and
        transmit the multiplexed uplink control information on both of the first uplink data channel and the second uplink data channel.

2. The wireless communication device of claim 1, wherein, to multiplex the uplink control information, the one or more processors are operable to execute the code to cause the wireless communication device to:
    determine that both of the repetition of the set of repetitions of the first uplink data channel and the repetition of the set of repetitions of the second uplink data channel satisfy a timing boundary associated with the uplink control channel; and
    multiplex the uplink control information on both of the repetition of the set of repetitions of the first uplink data channel and the repetition of the set of repetitions of the second uplink data channel based at least in part on both of the repetition of the set of repetitions of the first uplink data channel and the repetition of the set of repetitions of the second uplink data channel satisfying the timing boundary associated with the uplink control channel.

3. The wireless communication device of claim 2, wherein, to determine that both of the repetition of the set of repetitions of the first uplink data channel and the repetition of the set of repetitions of the second uplink data channel satisfy the timing boundary associated with the uplink control channel, the one or more processors are operable to execute the code to cause the wireless communication device to:
    determine an overlap between the uplink control channel and both of the repetition of the set of repetitions of the first uplink data channel and the repetition of the set of repetitions of the second uplink data channel, wherein, to multiplex the uplink control information, the one or more processors are operable to execute the code to cause the wireless communication device to:
        multiplex the uplink control information on both of the repetition of the set of repetitions of the first uplink data channel and the repetition of the set of repetitions of the second uplink data channel based at least in part on the overlap between the uplink control channel and both of the repetition of the set of repetitions of the first uplink data channel and the repetition of the set of repetitions of the second uplink data channel.

4. The wireless communication device of claim 3, wherein, to determine the overlap, the one or more processors are operable to execute the code to cause the wireless communication device to:
    determine that a resource associated with the uplink control channel overlaps with both of a resource associated with the repetition of the set of repetitions of the first uplink data channel and a resource associated with the repetition of the set of repetitions of the second uplink data channel.

5. The wireless communication device of claim 1, wherein the one or more processors are further operable to execute the code to cause the wireless communication device to:
    determine an overlap between the uplink control channel and one or both of a first repetition of the set of repetitions of the first uplink data channel and a first repetition of the set of repetitions of the second uplink data channel, wherein, to multiplex the uplink control information, the one or more processors are operable to execute the code to cause the wireless communication device to:
  multiplex the uplink control information on both of the first repetition of the set of repetitions of the first uplink data channel and the first repetition of the set of repetitions of the second uplink data channel based at least in part on the overlap between the uplink control channel and both of the first repetition of the set of repetitions of the first uplink data channel and the first repetition of the set of repetitions of the second uplink data channel.

6. The wireless communication device of claim 1, wherein the one or more processors are further operable to execute the code to cause the wireless communication device to:
  determine an overlap between the uplink control channel and both of a second repetition of the set of repetitions of the first uplink data channel and a second repetition of the set of repetitions of the second uplink data channel, wherein, to multiplex the uplink control information, the one or more processors are operable to execute the code to cause the wireless communication device to:
  multiplex the uplink control information on both of the second repetition of the set of repetitions of the first uplink data channel and the second repetition of the set of repetitions of the second uplink data channel based at least in part on the overlap between the uplink control channel and both of the second repetition of the set of repetitions of the first uplink data channel and the second repetition of the set of repetitions of the second uplink data channel.

7. The wireless communication device of claim 1, wherein the one or more processors are further operable to execute the code to cause the wireless communication device to:
  determine an overlap between the uplink control channel and a first repetition of the set of repetitions of the second uplink data channel, wherein, to multiplex the uplink control information, the one or more processors are operable to execute the code to cause the wireless communication device to:
  multiplex the uplink control information on both of the first repetition of the set of repetitions of the second uplink data channel and a second repetition of the set of repetitions of the first uplink data channel based at least in part on the overlap between the uplink control channel and the first repetition of the set of repetitions of the second uplink data channel.

8. The wireless communication device of claim 7, wherein the one or more processors are further operable to execute the code to cause the wireless communication device to:
  determine a nonoverlap between the uplink control channel and a first repetition of the set of repetitions of the first uplink data channel; and
  refrain from multiplexing the uplink control information with the first repetition of the set of repetitions of the first uplink data channel based at least in part on the nonoverlap.

9. The wireless communication device of claim 8, wherein, to refrain from multiplexing the uplink control information with the first repetition of the set of repetitions of the first uplink data channel, the one or more processors are operable to execute the code to cause the wireless communication device to:
  drop the first uplink data channel.

10. The wireless communication device of claim 7, wherein the first repetition of the set of repetitions of the second uplink data channel occurs before the second repetition of the set of repetitions of the first uplink data channel.

11. The wireless communication device of claim 1, wherein the one or more processors are further operable to execute the code to cause the wireless communication device to:
  determine a nonoverlap between the uplink control channel and a second repetition of the set of repetitions of the first uplink data channel; and
  determine an overlap between the uplink control channel and a second repetition of the set of repetitions of the second uplink data channel.

12. The wireless communication device of claim 11, wherein, to multiplex the uplink control information, the one or more processors are operable to execute the code to cause the wireless communication device to:
  multiplex the uplink control information with the second repetition of the set of repetitions of the second uplink data channel based at least in part on the overlap between the uplink control channel and the second repetition of the set of repetitions of the second uplink data channel.

13. The wireless communication device of claim 11, wherein the one or more processors are further operable to execute the code to cause the wireless communication device to:
  refrain from multiplexing the uplink control information with the second repetition of the set of repetitions of the second uplink data channel based at least in part on the second repetition of the set of repetitions of the second uplink data channel corresponding to an ending of a slot; and
  transmit the uplink control information on the uplink control channel based at least in part on the refraining.

14. The wireless communication device of claim 13, wherein, to refrain from multiplexing the uplink control information with the second repetition of the set of repetitions of the second uplink data channel, the one or more processors are operable to execute the code to cause the wireless communication device to:
  drop the second uplink data channel.

15. The wireless communication device of claim 1, wherein the one or more processors are further operable to execute the code to cause the wireless communication device to:
  receive, during a first slot, a downlink control information message comprising an indication to multiplex second uplink control information on both of a second repetition of the set of repetitions of the first uplink data channel and a second repetition of the set of repetitions of the second uplink data channel during a second slot; and
  multiplex the second uplink control information on the second repetition of the set of repetitions of the first uplink data channel and the second repetition of the set of repetitions of the second uplink data channel based at least in part on the indication in the received downlink control information message.

16. The wireless communication device of claim 15, wherein the second repetition of the set of repetitions of the first uplink data channel and the second repetition of the set of repetitions of the second uplink data channel are consecutive.

17. The wireless communication device of claim 15, wherein the second repetition of the set of repetitions of the first uplink data channel and the second repetition of the set of repetitions of the second uplink data channel are nonconsecutive.

18. The wireless communication device of claim 15, wherein the one or more processors are further operable to execute the code to cause the wireless communication device to:
determine an overlap between the uplink control channel and both of the second repetition of the set of repetitions of the first uplink data channel and the second repetition of the set of repetitions of the second uplink data channel, wherein, to multiplex the uplink control information, the one or more processors are operable to execute the code to cause the wireless communication device to:
multiplex the uplink control information on both of the second repetition of the set of repetitions of the first uplink data channel and the second repetition of the set of repetitions of the second uplink data channel based at least in part on the overlap between the uplink control channel and both of the second repetition of the set of repetitions of the first uplink data channel and the second repetition of the set of repetitions of the second uplink data channel.

19. The wireless communication device of claim 15, wherein the one or more processors are further operable to execute the code to cause the wireless communication device to:
determine an overlap between the uplink control channel and the second repetition of the set of repetitions of the second uplink data channel; and
refrain from multiplexing the uplink control information on the second repetition of the set of repetitions of the first uplink data channel, wherein, to multiplex the uplink control information, the one or more processors are operable to execute the code to cause the wireless communication device to:
multiplex the uplink control information with the second repetition of the set of repetitions of the second uplink data channel based at least in part on the overlap between the uplink control channel and the second repetition of the set of repetitions of the second uplink data channel, the second repetition of the set of repetitions of the second uplink data channel corresponding to an ending of the second slot.

20. The wireless communication device of claim 1, wherein the one or more processors are further operable to execute the code to cause the wireless communication device to:
determine that both of a subset of repetitions associated with the set of repetitions of the first uplink data channel and a subset of repetitions associated with the set of repetitions of the second uplink data channel satisfy a timing boundary associated with the uplink control channel, wherein, to multiplex the uplink control information, the one or more processors are operable to execute the code to cause the wireless communication device to:
multiplex the uplink control information on both of the subset of repetitions associated with the set of repetitions of the first uplink data channel and the subset of repetitions associated with the set of repetitions of the second uplink data channel based at least in part on satisfying the timing boundary.

21. The wireless communication device of claim 20, wherein both of the subset of repetitions associated with the set of repetitions of the first uplink data channel and the subset of repetitions associated with the set of repetitions of the second uplink data channel are associated with a same slot.

22. The wireless communication device of claim 20, wherein, to multiplex the uplink control information, the one or more processors are operable to execute the code to cause the wireless communication device to:
multiplex the uplink control information with an earliest repetition associated with the set of repetitions of the first uplink data channel or an earliest repetition associated with the set of repetitions of the second uplink data channel to a latest repetition associated with the set of repetitions of the first uplink data channel or a latest repetition associated with the set of repetitions of the second uplink data channel.

23. The wireless communication device of claim 1, wherein the one or more processors are further operable to execute the code to cause the wireless communication device to:
determine a type of the uplink control information, wherein multiplexing the uplink control information on both of the repetition of the set of repetitions of the first uplink data channel and the repetition of the set of repetitions of the second uplink data channel is based at least in part on the type of the uplink control information.

24. The wireless communication device of claim 1, wherein the one or more processors are further operable to execute the code to cause the wireless communication device to:
determine a payload size of the uplink control information, wherein multiplexing the uplink control information on both of the repetition of the set of repetitions of the first uplink data channel and the repetition of the set of repetitions of the second uplink data channel is based at least in part on the payload size of the uplink control information,
wherein the payload size comprises an uplink control information payload size.

25. The wireless communication device of claim 1, wherein the one or more processors are further operable to execute the code to cause the wireless communication device to:
receive a downlink control information message comprising an indication of a duration of each repetition of the set of repetitions of the first uplink data channel and a duration of each repetition of the set of repetitions of the second uplink data channel; and
determine resources to use for the uplink control information when multiplexing the uplink control information on both of the repetition of the set of repetitions of the first uplink data channel and the repetition of the set of repetitions of the second uplink data channel based at least in part on the indication received in the downlink control information message.

26. The wireless communication device of claim 1, wherein the repetition of the set of repetitions of the first uplink data channel and the repetition of the set of repetitions of the second uplink data channel are consecutive.

27. The wireless communication device of claim 1, wherein the repetition of the set of repetitions of the first uplink data channel and the repetition of the set of repetitions of the second uplink data channel are nonconsecutive.

28. The wireless communication device of claim 1, wherein the set of repetitions associated with the first uplink data channel and the set of repetitions associated with the second uplink data channel comprise a cyclic repetition.

29. The wireless communication device of claim 1, wherein the set of repetitions associated with the first uplink data channel and the set of repetitions associated with the second uplink data channel comprise a sequential repetition.

30. An wireless communication device for wireless communications, comprising:
   means for determining a set of repetitions of a first uplink data channel associated with a first directional beam and a set of repetitions of a second uplink data channel associated with a second directional beam different from the first directional beam;
   means for multiplexing uplink control information associated with an uplink control channel on both of a repetition of the set of repetitions of the first uplink data channel and a repetition of the set of repetitions of the second uplink data channel, based at least in part on the set of repetitions of the first uplink data channel and the set of repetitions of the second uplink data channel; and
   means for transmitting the multiplexed uplink control information on both of the first uplink data channel and the second uplink data channel.

31. A non-transitory computer-readable medium storing code for wireless communications at a user equipment (UE), the code comprising instructions executable by a processor to:
   determine a set of repetitions of a first uplink data channel associated with a first directional beam and a set of repetitions of a second uplink data channel associated with a second directional beam different from the first directional beam;
   multiplex uplink control information associated with an uplink control channel on both of a repetition of the set of repetitions of the first uplink data channel and a repetition of the set of repetitions of the second uplink data channel, based at least in part on the set of repetitions of the first uplink data channel and the set of repetitions of the second uplink data channel; and
   transmit the multiplexed uplink control information on both of the first uplink data channel and the second uplink data channel.

32. A method for wireless communications at a user equipment (UE), comprising:
   determining a set of repetitions of a first uplink data channel associated with a first directional beam and a set of repetitions of a second uplink data channel associated with a second directional beam different from the first directional beam;
   multiplexing uplink control information associated with an uplink control channel on both of a repetition of the set of repetitions of the first uplink data channel and a repetition of the set of repetitions of the second uplink data channel, based at least in part on the set of repetitions of the first uplink data channel and the set of repetitions of the second uplink data channel; and
   transmitting the multiplexed uplink control information on both of the first uplink data channel and the second uplink data channel.

33. The method of claim 32, wherein multiplexing the uplink control information comprises:
   determining that both of the repetition of the set of repetitions of the first uplink data channel and the repetition of the set of repetitions of the second uplink data channel satisfy a timing boundary associated with the uplink control channel; and
   multiplexing the uplink control information on both of the repetition of the set of repetitions of the first uplink data channel and the repetition of the set of repetitions of the second uplink data channel based at least in part on both of the repetition of the set of repetitions of the first uplink data channel and the repetition of the set of repetitions of the second uplink data channel satisfying the timing boundary associated with the uplink control channel.

34. The method of claim 33, wherein determining that both of the repetition of the set of repetitions of the first uplink data channel and the repetition of the set of repetitions of the second uplink data channel satisfy the timing boundary associated with the uplink control channel comprises:
   determining an overlap between the uplink control channel and both of the repetition of the set of repetitions of the first uplink data channel and the repetition of the set of repetitions of the second uplink data channel, wherein multiplexing the uplink control information comprises:
      multiplexing the uplink control information on both of the repetition of the set of repetitions of the first uplink data channel and the repetition of the set of repetitions of the second uplink data channel based at least in part on the overlap between the uplink control channel and both of the repetition of the set of repetitions of the first uplink data channel or the repetition of the set of repetitions of the second uplink data channel.

35. The method of claim 34, wherein determining the overlap comprises:
   determining that a resource associated with the uplink control channel overlaps with both of a resource associated with the repetition of the set of repetitions of the first uplink data channel and a resource associated with the repetition of the set of repetitions of the second uplink data channel.

\* \* \* \* \*